(12) United States Patent  
Pavlidis et al.

(10) Patent No.: US 7,027,619 B2
(45) Date of Patent: Apr. 11, 2006

(54) NEAR-INFRARED METHOD AND SYSTEM FOR USE IN FACE DETECTION

(75) Inventors: Ioannis Pavlidis, Minneapolis, MN (US); Jonathan B. Dowdall, Reno, NV (US)

(73) Assignee: Honeywell International Inc., Morristown, NJ (US)

( * ) Notice: Subject to any disclaimer, the term of this patent is extended or adjusted under 35 U.S.C. 154(b) by 694 days.

(21) Appl. No.: 10/077,672

(22) Filed: Feb. 15, 2002

(65) Prior Publication Data

US 2003/0053664 A1   Mar. 20, 2003

Related U.S. Application Data

(60) Provisional application No. 60/318,786, filed on Sep. 13, 2001.

(51) Int. Cl.
*G06K 9/00* (2006.01)

(52) U.S. Cl. ..................................... 382/115
(58) Field of Classification Search ............... 382/103, 382/115, 116, 117, 118, 173, 190, 191, 192, 382/193, 194, 195, 205, 206, 209, 216, 217, 382/218; 250/330, 331, 332, 333, 334, 356.1, 250/338.1, 339.06, 339.11, 341.8; 348/77, 348/78, 164, 169, 342; 340/5.53, 5.83, 545.3
See application file for complete search history.

(56) References Cited

U.S. PATENT DOCUMENTS

| 4,057,352 A | 11/1977 | Babb ........................ 356/407 |
| 4,500,784 A | 2/1985 | Hacskaylo ............. 250/339.11 |
| 4,520,504 A | 5/1985 | Walker et al. .............. 382/100 |
| 4,733,081 A | 3/1988 | Mizukami ................ 250/341.8 |
| 5,013,917 A | 5/1991 | Ulich ......................... 250/330 |
| 5,180,907 A | 1/1993 | Udden et al. ............... 250/205 |
| 5,221,919 A | 6/1993 | Hermans ..................... 340/567 |
| 5,293,427 A | 3/1994 | Ueno et al. ................. 382/103 |
| 5,703,367 A | 12/1997 | Hashimoto et al. ......... 250/342 |
| 5,792,050 A | 8/1998 | Alam et al. ................. 600/310 |

(Continued)

FOREIGN PATENT DOCUMENTS

EP  0 990 416 A1   4/2000

(Continued)

OTHER PUBLICATIONS

Ballard. "Generalizing the Hough Transform to Detect Arbitrary Shapes," Pattern Recognition, vol. 13, No. 2, pp. 111-122, 1981.

(Continued)

*Primary Examiner*—Bhavesh M. Mehta
*Assistant Examiner*—Sath V. Perungavoor
(74) *Attorney, Agent, or Firm*—Kris T. Fredrick

(57) ABSTRACT

A method and system for use in detecting a face of a person includes providing image data representative of reflected light of a scene in at least one bandwidth within a reflected infrared radiation range. Regions of the scene in the image data which may correspond to one or both eyebrows of a person and which may correspond to one or both eyes of the person are extracted from the data. The extracted regions which may correspond to one or both eyebrows of the person are combined with the extracted regions that may correspond to one or both eyes of the person resulting in a composite feature image. The composite feature image is searched based on model data representative of an eye region to detect one or both eyes of the person.

42 Claims, 23 Drawing Sheets

U.S. PATENT DOCUMENTS

| | | | | |
|---|---|---|---|---|
| 5,801,763 | A | | 9/1998 | Suzuki ................... 348/77 |
| 5,859,921 | A | * | 1/1999 | Suzuki ................... 382/118 |
| 5,866,887 | A | | 2/1999 | Hashimoto et al. ........ 235/98 R |
| 5,870,138 | A | * | 2/1999 | Smith et al. ................ 348/143 |
| 5,878,156 | A | * | 3/1999 | Okumura ................... 382/118 |
| 5,900,942 | A | | 5/1999 | Spiering ................... 356/400 |
| 5,940,139 | A | | 8/1999 | Smoot ................... 348/584 |
| 6,002,505 | A | | 12/1999 | Kraenert et al. ............ 359/196 |
| 6,121,953 | A | * | 9/2000 | Walker ................... 345/156 |
| 6,178,259 | B1 | | 1/2001 | Harris ................... 382/170 |
| 6,353,764 | B1 | | 3/2002 | Imagawa et al. ............ 700/1 |
| 6,370,260 | B1 | | 4/2002 | Pavlidis et al. ............ 382/103 |
| 6,498,564 | B1 | | 12/2002 | Oda ................... 340/567 |
| 6,717,518 | B1 | * | 4/2004 | Pirim et al. ................. 340/576 |
| 2002/0136435 | A1 | * | 9/2002 | Prokoski ................... 382/118 |

FOREIGN PATENT DOCUMENTS

| | | |
|---|---|---|
| WO | 97/21188 | 6/1997 |
| WO | 01/95247 | 12/2001 |

OTHER PUBLICATIONS

Fendt et al., "The Neuroanatomical and Neurochemical Basis of Conditioned Fear," Neurosci Biobehav Rev, 23(5): 743-60 (May, 1999).

Huang et al., "Face Detection and Precise Eyes Location," in Proceedings 15th International Conference on Pattern Recognition, 2000, vol. 4, pp. 722-727.

Jacquez et al., "The Spectral Refelectance of Human Skin in the Region 0.7-2.6μm," Technical Report 189, Army Medical Research Laboratory, Fort Knox (Apr. 1955).

Jeon et al., "Rotation Invariant Face Detection Using a Model-Based Clustering Algorithm," in Proceedings 2000 IEEE International Conference on Multimedia and Expo, 2000, vol. 2, pp. 1149-1152.

Jordan et al., "Hierarchical Mixtures of Experts and the EM Algorithm," Neural Computation, 6, pp. 181-214 (1994).

Kawato et al., "Two-Step Approach for Real-time Eye Tracking with a New Filtering Technique," in Proceedings 2000 IEEE International Conference on Systems, Man, and Cybernetics, 2000, vol. 2, pp. 1366-1371.

Kim et al., "Face Detection Using Multi-Modal Information" in Proceedings Fourth IEEE International Conference on Automatic Face and Gesture Recognition, 2000, pp. 14-19.

Levine et al., "The Energy Expended in Chewing Gum," New England Journal of Medicine, 341(27):2100 (Dec. 1999).

Li et al., "Multi-View Face Detection Using Support Vector Machines and Eigenspace Modeling," in Proceedings Fourth International Conference on Knowledge-Based Intelligent Engineering Systems & Allied Technologies, 2000, vol. 1, pp. 241-244.

Lv et al., "A Novel Algorithm for Rotated Human Face Detection," in Proceedings IEEE Conference on Computer Vision and Pattern Recognition, 2000. vol. 1, pp. 760-765.

Mendez. "The Master of Disguise", William Morrow and Co., New York, NY; cover page, title page, copyright page and table of contents only; 4 pgs. (1999).

Moghaddam et al., "Probabilistic Visual Learning for Object Recognition," IEEE Trans. Pattern Analysis and Machine Intelligence, 19(7):696-710 (Jul. 1997).

Morimoto et al., "Real-Time Multiple Face Detection Using Active Illumination," in Proceedings Fourth IEEE International Conference on Automatic Face and Gesture Recognition, 2000. pp. 8-13.

Otsu, "A Threshold Selection Method from Gray-Level Histograms", IEEE Transactions on Systems, Man and Cybernetics, vol. SMC-9, No. 1, 62-65 (Jan. 1979).

Pavlidis et al., "A Vehicle Occupant Counting System Based on Near-Infrared Phenomenology and Fuzzy Neural Classification," IEEE Transactions on Intelligent Transportation Systems, vol. 1, No. 2, pp. 72-85, Jun. 2000.

Pavlidis et al., "The Imaging Issue in an Automatic Face/Disguise Detection System," in Proceedings IEEE Workshop on Computer Vision beyond the Visible Spectrum: Methods and Applications, 2000. pp. 15-24.

Pavlidis et al., "Automatic Passenger Counting in the High Occupancy Vehicle (HOV) Lanes", Proceedings 1999 Annual Meeting of the Intelligent Transportation Society of America, Washington, DC (Apr. 19-22, 1999).

Pavlidis et al., "A Near-Infrared Fusion Scheme for Automatic Detection of Vehicle Passengers," Proceedings 1999 IEEE Workshop on Computer Vision Beyond the Visible Spectrum: Methods and Applications, 41-48, Fort Collins, C.O. (Jun. 22, 1999).

Penev et al., "Local Feature Analysis: A General Statistical Theory for Object Representation," Network: Computation in Neural Systems, 7(3):477-500 (Aug. 1996).

Pentland et al., "Face Recognition for Smart Environments," IEEE Computer, 33(2):50-55 (Feb. 2000).

Phillips et al., "The FERET Database and Evaluation Procedure for Face-Recognition Algorithms," Image and Vision Computing, 16(5):295-306 (Apr. 1998).

Prokoski. "Disguise Detection and Identification Using Infrared Imagery", Proceedings of SPIE, Optics and Images in Law Enforcement II, 339:27-341, A.S. Hecht, ed., Arlington V.A. (May 1982).

Rowley et al., "Neural Network-Based Face Detection," IEEE Transactions on Pattern Analysis and Machine Intelligence, vol. 20, No. 1, pp. 23-38, Jan. 1998.

Sabins. "Remote Sensing Principles and Interpretation", W.H. Freeman and Company, New York, NY: cover page, title page, copyright page and table of contents only; 7 pgs. (1997, 3rd ed.).

Sliney. "Laser and Led Eye Hazards: Safety Standards," Optics and Photonics News, pp. 32-37, Sep. 1997.

Visionics Corporation. "Face Detection Constantly Searches for Faces in a Datastream", Jersey City, NJ.; retrieved from the Internet on Jun. 25, 2001, <URL:http://www.visionics.com/faceit/tech/detect.html>m 1 pg.

Wilder et al., "Comparison of Visible and Infra-Red Imagery for Face Recognition," Proceedings Second IEEE International Conference on Automatic Face and Gesture Recognition, 1996. pp. 182-187.

Wiskott et al., "Face Recognition by Elastic Bunch Graph Matching," IEEE Trans. Pattern Analysis and Machine Intelligence, 19(7):775-779 (Jul. 1997).

Zhu et al., "Fast Face Detection Using Subspace Discriminant Wavelet Features," in Proceedings IEEE Conference on Computer Vision and Pattern Recognition, 2000, vol. 1, pp. 636-641.

Zhu et al., "Region Competition: Unifying Snakes, Region Growing, and Bayes/MDL for Multiband Image Segmentation," IEEE Transactions on Image Analysis and Machine Intelligence, 18(9):884-900 (Sep. 1996).

Prokoski et al., "Identification of Individuals by Means of Facial Thermograph" Proceedings of the International Carnahan Conference on Security Technology: Crime Countermeasures. Atlanta, Oct. 14-16, 1992, NY, IEEE US, Oct. 14, 1992 pp. 120-125, XP000357473, p. 121, Right-Hand Column, Line 4, p. 122, Left-Hand Column, Last Paragraph: Table 2.

* cited by examiner

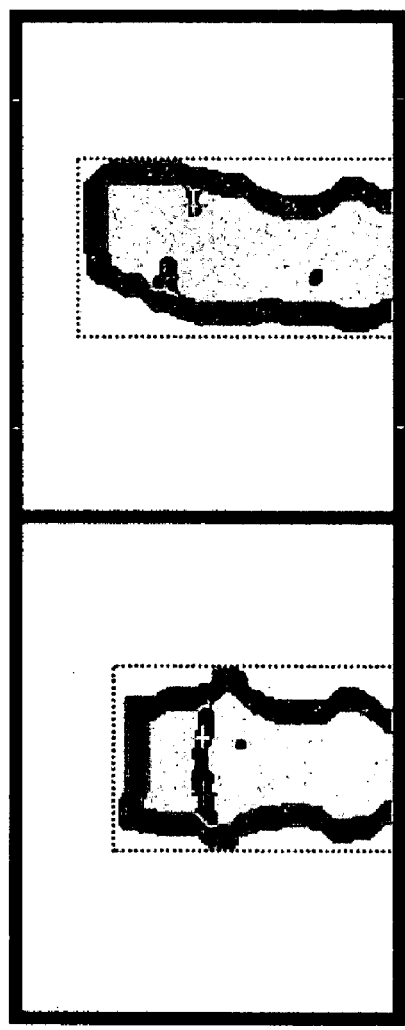
Fig. 28a
Fig. 28b
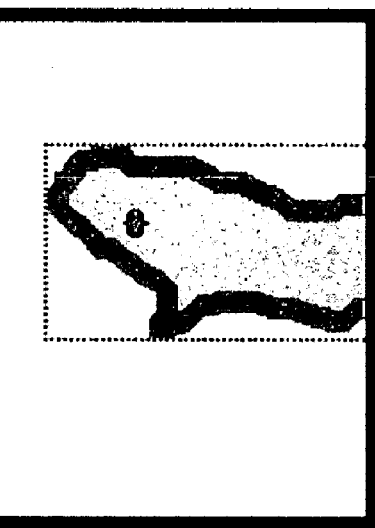
Fig. 28c

NEAR-INFRARED METHOD AND SYSTEM FOR USE IN FACE DETECTION

CROSS-REFERENCE TO RELATED APPLICATIONS

This application claims the benefit of U.S. Provisional Application No. 60/318,786 entitled "FACE DETECTION SYSTEM AND METHOD," filed 13 Sep. 2001, wherein such document is incorporated herein by reference.

GOVERNMENT RIGHTS

This invention was made with United States Government support under grant no. NSF/CRCD 0088086 awarded by the Agency: NSF. The United States Government has certain rights in this invention.

BACKGROUND OF THE INVENTION

The present invention pertains to detection systems and methods. More particularly, the present invention pertains to detection systems and methods using the near-infrared spectrum for the detection of, for example, facial features.

In many situations, detection of individuals is very important. For example, detection of individuals is required in many high-end security applications, e.g., surveillance of an embassy perimeter where there is a need to know who certain individuals are within a particular setting. Further, for example, such detection systems and methods may not only be required in high-end security situations, but may also be needed in government buildings, schools, airports, and border control points. As such, systems for detection and identification of individuals, e.g., detection at a distance, need to be developed and implemented. Such systems would be most advantageous in the context of protecting high value assets (e.g. perimeter of government buildings) from asymmetric (e.g., terrorist) threats.

Generally, certain recent biometric technologies (e.g., such as face recognition systems that may be able to match pre-stored data regarding a particular individual to real time collected data of an individual) have been developed which may be used in situations such as those described above. However, such face recognition systems are not without problems. For example, many face recognition systems do not have adequate detection techniques for detecting that one or more persons exist within a scene being monitored (e.g., identification of the existence of a person and/or detection of one or more facial features of a person). Further, for example, many face recognition systems are not able to successfully determine the orientation of a person's face or extent of a person's face such that a face recognition algorithm can be effectively applied to the detected individual.

Face detection, e.g., the detection of a face in a scene and/or the detection of one or more facial features of a person in a scene, is an important prerequisite step for successful application of face recognition algorithms. For example, stored facial signatures must be applied to a facial image in coordinated or aligned fashion. In other words, face detection is an important preprocessing stage of an overall face recognition system and provides the face recognition system with one or more points or facial features that allow the stored facial signature of individuals to be compared effectively to a current image of a person that has been detected. For example, the face detection technique may provide a location of the center of the eyes on an image of an individual such that the facial signature can be aligned therewith (e.g., alignment of the eyes of facial signatures with the eyes of the image of the individual being analyzed).

Face detection is a challenging machine vision operation, particularly in outdoor environments where illumination varies greatly. Such environmental conditions is one of the primary reasons that face recognition systems are generally constrained to access control applications in indoor settings. Therefore, a major technical challenge that needs to be addressed in expanding the use of such face recognition technologies is the low performance of face detectors in unconstrained environments.

Visible-band face detectors, such as those reported in the literature, opt for pure algorithmic solutions to inherent phenomenology problems. Human facial signatures vary significantly across races in the visible band. This variability coupled with dynamic lighting conditions present a formidable problem. Reducing light variability through the use of an artificial illuminator is rather awkward in the visible band because it may be distracting to the eyes of the people in the scene and "advertises" the existence of the surveillance system.

In recent years a sizable body of research in the area of face detection has been amassed. The methodologies vary, but the research mainly centers around three different approaches: artificial neural networks, feature extraction, and wavelet analysis. Each of these approaches has its respective strengths and weaknesses when applied to face detection, but none has yet been able to attain results rivaling human perception.

The majority of face detection research has been focused around various types of feature extraction. Feature extraction methods utilize various properties of the face and skin to isolate and extract desired data. Popular methods include skin color segmentation, principal component analysis, Eigenspace modeling, histogram analysis, texture analysis, and frequency domain features.

Face detection research based on artificial neural networks has also received attention. One of the problems with this approach is finding a representative data set. This difficulty is compounded by the fact that a strong counter example set must also be compiled to train the individual networks.

The general aim of the wavelet approach is maximum class discrimination and signal dimensionality reduction. Due to the reduced dimensionality, wavelet-based methods are computationally efficient.

However, all of the above approaches are associated with visible spectrum imagery. Therefore, they are susceptible to light changes and the variability of human facial appearance in the visible band.

SUMMARY OF THE INVENTION

There is a need for improved accuracy in face detection systems, particularly under challenging environmental and lighting conditions. As such, according to the present invention, preferably multi-band feature extraction in the near-infrared spectrum is performed to provide reliable face detection. In other words, and for example, the present invention provides face detection, e.g., location of the eyes of the face of a human, based on near-infrared phenomenology with the use of multi-band feature extraction and the use of generalized model data (e.g., use of a Hough transform template).

For example, in one embodiment, the orientation and extent of the face within a detected skin region is provided by extracting features from multiple near-infrared bands. Then, a generalized Hough transform, modeled after the expected appearance of the eye region (e.g., the human eye and eyebrow pair) in a composite feature image, is applied at each point of the detected skin region. The strongest response to the generalized template yields an eye blob image in which an eye may be located and from which one can locate the centers of one or both of the subject's eyes.

Facial signatures are less variable in the near-infrared which aids significantly in such detection. Further, illumination in the scene can be maintained at an optimal level through a feedback control loop that includes a near-infrared illuminator. In addition, since near-infrared light is invisible to the human eye, the face detection can be performed in an unobtrusive and covert manner. Such advantages in combination with the unique reflectance characteristics of the human skin in the near-infrared spectrum allow for simple and reliable algorithmic based face detection.

A method for use in detecting a face of a person according to the present invention includes providing image data representative of reflected light of a scene in at least one bandwidth within a reflected infrared radiation range. Regions of the scene in the image data which may correspond to one or both eyebrows of a person are extracted and regions of the scene in the image data which may correspond to one or both eyes of the person are extracted. The extracted regions of the scene which may correspond to one or both eyebrows of the person are combined with the extracted regions of the scene that may correspond to one or both eyes of the person resulting in a composite feature image. The composite feature image is then searched based on model data representative of an eye region to detect one or both eyes of the person.

In one embodiment of the method, a first image output is provided that is representative of reflected light of a scene in a first bandwidth within a reflected infrared radiation range. Regions of the scene in the first image output are extracted which may correspond to one or both eyebrows of the person. The regions that may correspond to one or both eyebrows of the person have a comparatively higher reflectivity in the first bandwidth than the reflectivity of human skin. In addition, a second image output representative of reflected light of a scene in a second bandwidth within a reflected infrared radiation range is provided. Regions of the scene in the second image output are extracted which may correspond to one or both eyes of the person. The regions that may correspond to one or both eyes of the person have a comparatively lower reflectivity in the second bandwidth than the reflectivity of human skin.

In another embodiment of the method, a facial search area is defined by isolating skin of a person in the scene relative to background, e.g., based on the first and second image output. For example, a difference in reflectance for human skin in the first bandwidth relative to the second bandwidth is greater than a difference in reflectance for objects in the background other than human skin in the first bandwidth relative to the second bandwidth.

In yet another embodiment of the method, the composite feature image is searched based on model data representative of an eye region to detect one or both eyes of the person. Such searching may result in one or more eye containing regions, e.g., applying a template representative of a relationship between eyes and eyebrows of a plurality of persons to the composite feature image to locate the one or more eye containing regions. The center of one or both eyes within the one or more eye containing regions may then be estimated, e.g., determining whether the one or more eye containing regions are a single blob that spans a major portion of the face of the person, two blobs of about equivalent size, or a single blob that is relatively smaller than the size of the single blob that spans a major portion of the face of the person but is larger than other eye containing regions located.

A system for use in detecting a face of a person according to the present invention is also described. The system includes at least one imaging device operable to provide image data representative of reflected light of a scene in at least one bandwidth within a reflected infrared radiation range and a processing apparatus. The processing apparatus is operable to extract regions of the scene in the image data which may correspond to one or both eyebrows of a person, to extract regions of the scene in the image data which may correspond to one or both eyes of the person, to combine the extracted regions of the scene which may correspond to one or both eyebrows of the person with the extracted regions of the scene that may correspond to one or both eyes of the person resulting in a composite feature image, and search the composite feature image based on model data representative of an eye region to detect one or both eyes of the person.

In one embodiment of the system, the system may include a first imaging device sensitive to light of a first bandwidth within a reflected infrared radiation range to provide a first image output representative of the scene. Regions of the scene in the first image output are extracted which may correspond to one or both eyebrows of the person. The regions that may correspond to one or both eyebrows of the person have a comparatively higher reflectivity in the first bandwidth than the reflectivity of human skin. The system may further include a second imaging device sensitive to light of a second bandwidth within the reflected infrared radiation range to provide a second image output representative of the scene. Regions of the scene in the second image output are extracted which may correspond to one or both eyes of the person. The regions that may correspond to one or both eyes of the person have a comparatively lower reflectivity in the first bandwidth than the reflectivity of human skin.

In another embodiment of the system, the processing apparatus is further operable to define a facial search area by isolating skin of a person in the scene relative to background, e.g., based on the first and second image output such as by using a difference in reflectance for human skin in the first bandwidth relative to the second bandwidth.

In another embodiment of the system, the processing apparatus may be operable to search the composite feature image based on model data representative of an eye region resulting in one or more eye containing regions, e.g., apply a template representative of a relationship between eyes and eyebrows of a plurality of persons to the composite feature image to locate the one or more eye containing regions. Then, the center of one or both eyes within the one or more eye containing regions may be estimated.

In yet another embodiment of the system, the system includes a detection device operable to monitor luminance level in the scene and control means to dynamically adjust the luminance level provided by a light source in response thereto.

Another method for use in detecting a face of a person is described. The method includes providing a first image output representative of reflected light of a scene in a first bandwidth within a reflected infrared radiation range and providing a second image output representative of reflected light of a scene in a second bandwidth within a reflected infrared radiation range. At least a facial search area is defined by isolating skin of a person in the scene relative to background based on the first and second image output. A difference in reflectance for human skin in the first bandwidth relative to the second bandwidth is greater than a difference in reflectance for objects in the background other than human skin in the first bandwidth relative to the second bandwidth. Regions in the defined facial search area which may correspond to one or both eyebrows of the person are extracted. The regions that may correspond to one or both eyebrows of the person have a comparatively higher reflectivity in the first bandwidth than the reflectivity of human skin. Regions in the defined facial search area which may correspond to one or both eyes of the person are also extracted. The regions that may correspond to one or both eyes of the person have a comparatively lower reflectivity in the second bandwidth than the reflectivity of human skin. The extracted regions of the scene which may correspond to one or both eyebrows of the person are combined with the extracted regions of the scene that may correspond to one or both eyes of the person resulting in a composite feature image. The composite feature image is then searched based on model data representative of an eye region to locate one or more eye containing regions. The center of one or both eyes within the one or more eye containing regions is then estimated.

The above summary of the present invention is not intended to describe each embodiment or every implementation of the present invention. Advantages, together with a more complete understanding of the invention, will become apparent and appreciated by referring to the following detailed description and claims. Various other embodiments of the present invention are provided by the below Description.

BRIEF DESCRIPTION OF THE EMBODIMENTS

Figure 10:
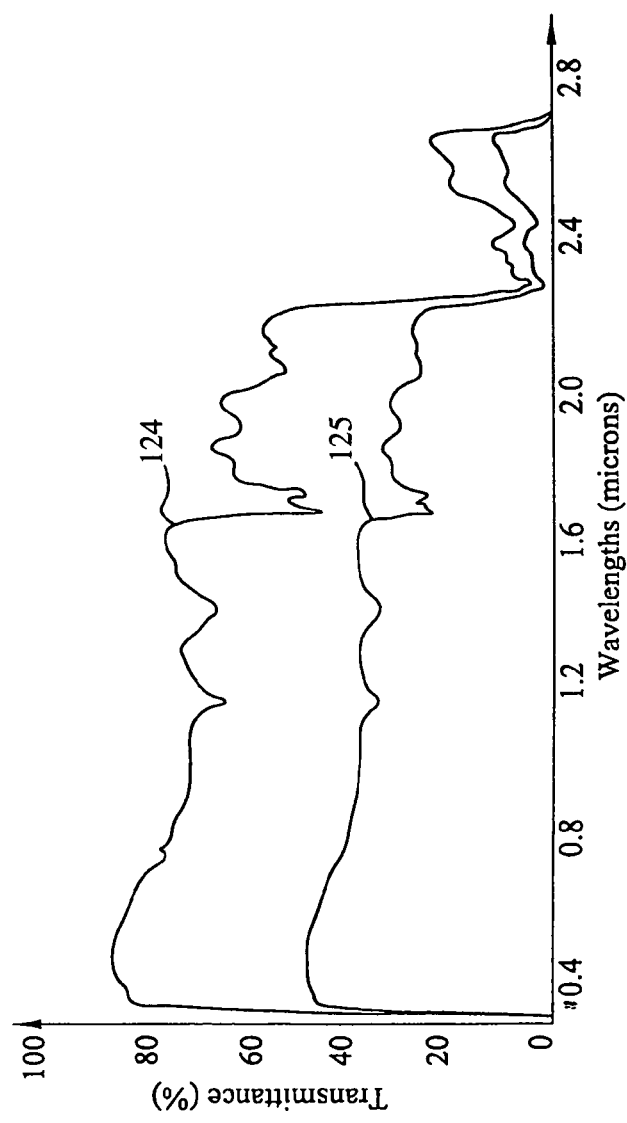

FIG. 10 reveals the infrared transmittance characteristics for an automobile windshield.

Figure 11:
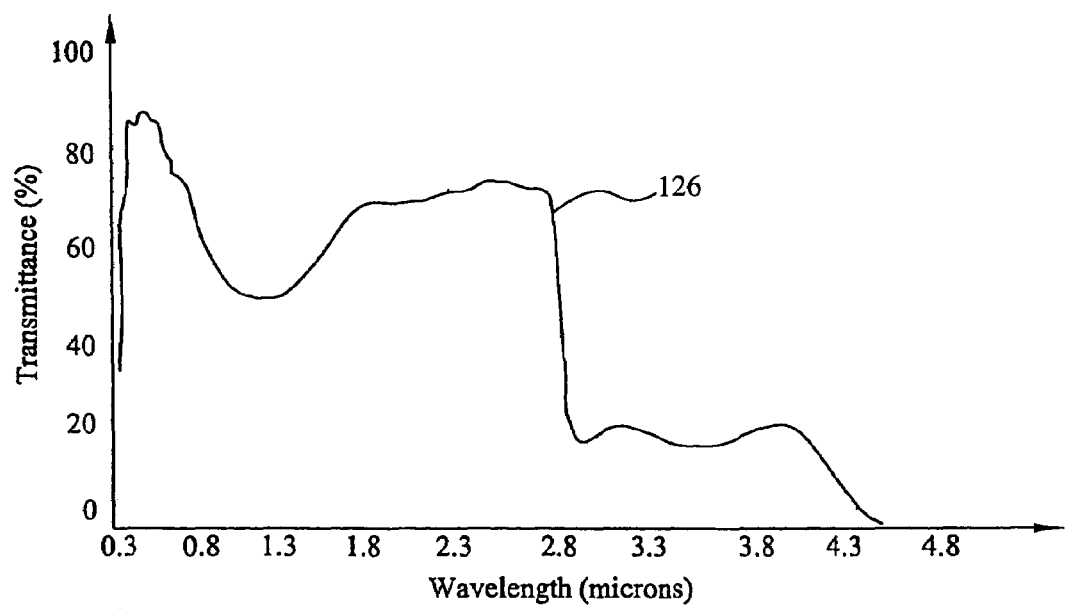

FIG. 11 reveals the infrared transmittance characteristics for an automobile side window.

Figure 12:
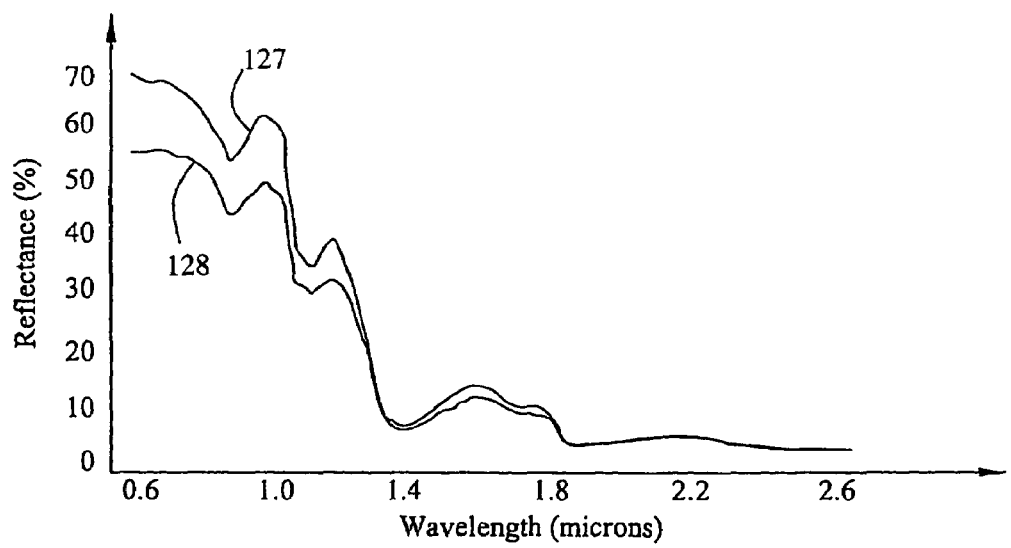

FIG. 12 is a graph showing the percentage of reflectance for Caucasian males of light and dark complexions.

Figure 13:
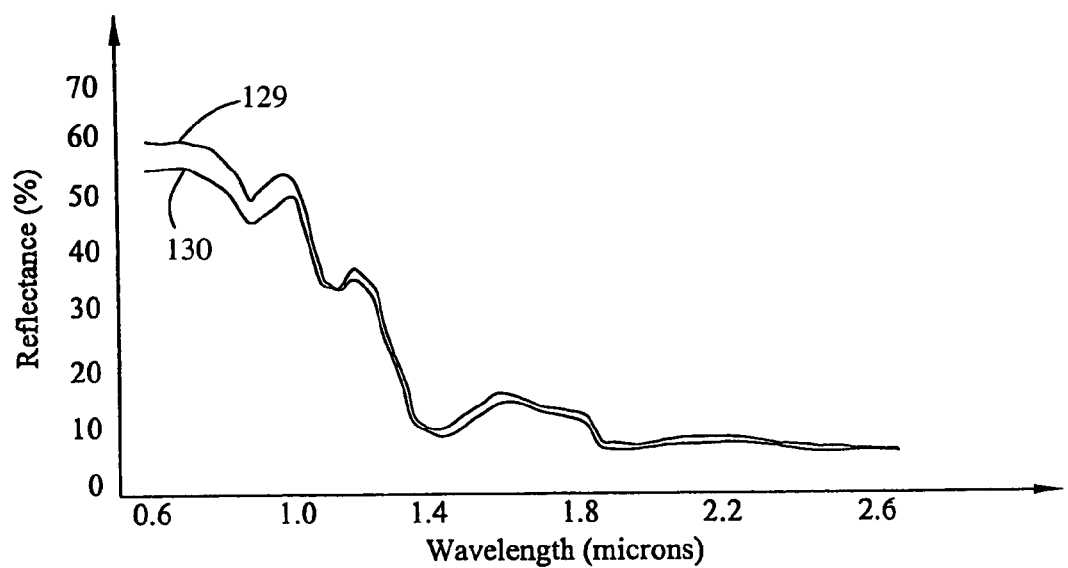

FIG. 13 is a graph showing the percentage of reflectance for Asian males of light and dark complexions.

Figure 14:
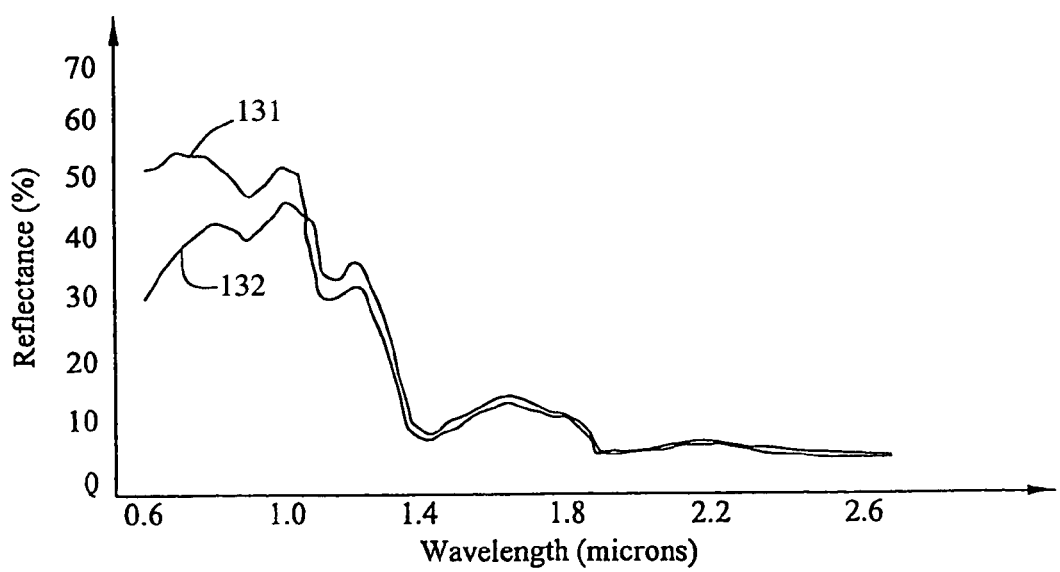

FIG. 14 is a graph showing the percentage of reflectance for black males of light and dark complexions.

Figure 15:
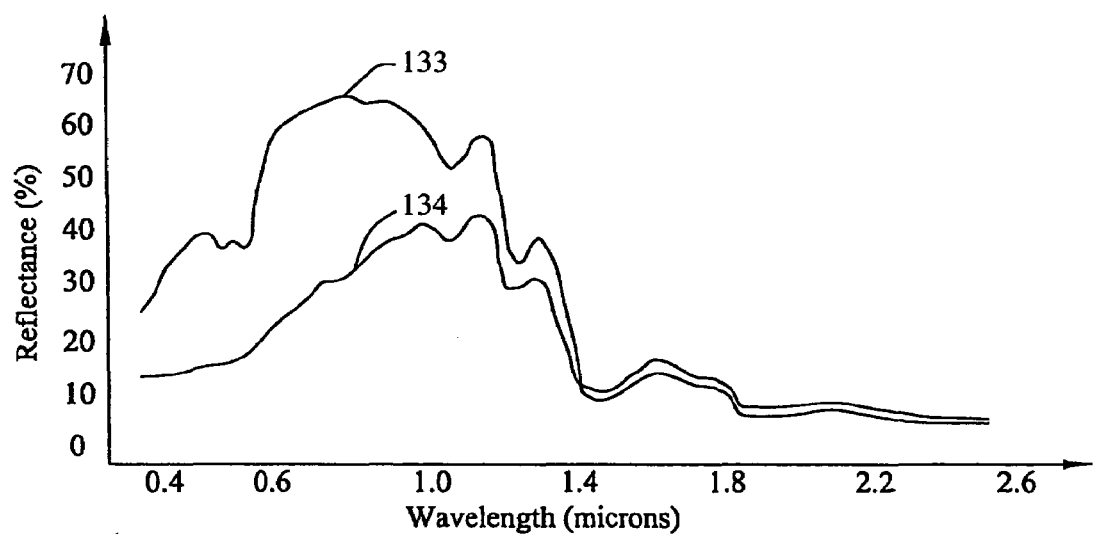

FIG. 15 is a graph showing a comparison of reflectance for light and dark skin.

Figure 16:
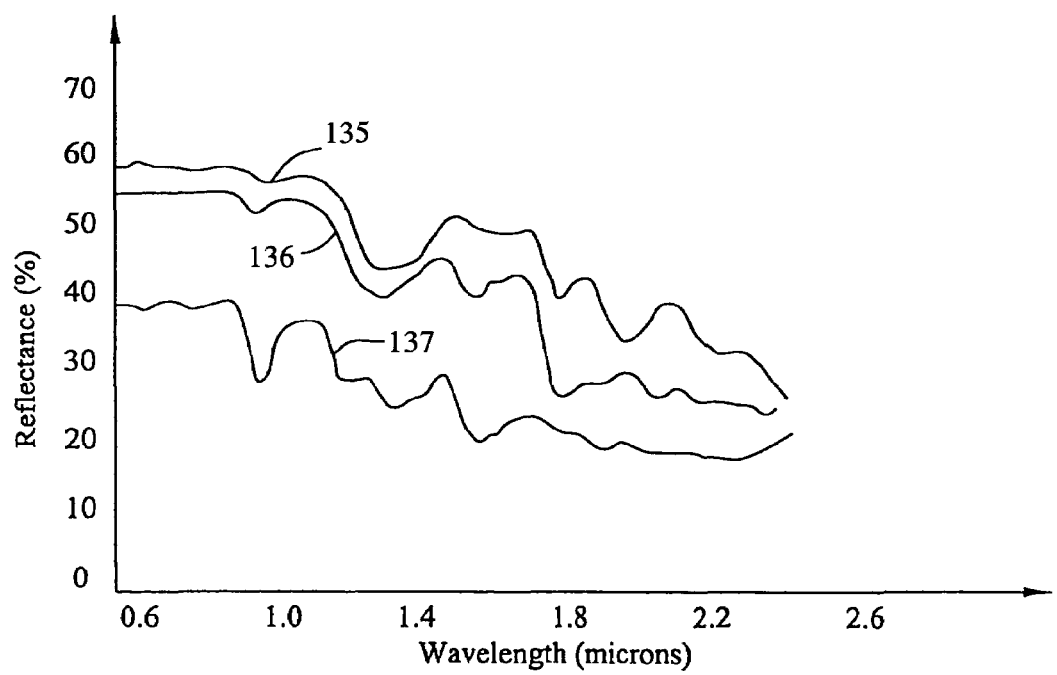

FIG. 16 is a graph of reflectance for cotton, wood and polyamide.

Figure 17:
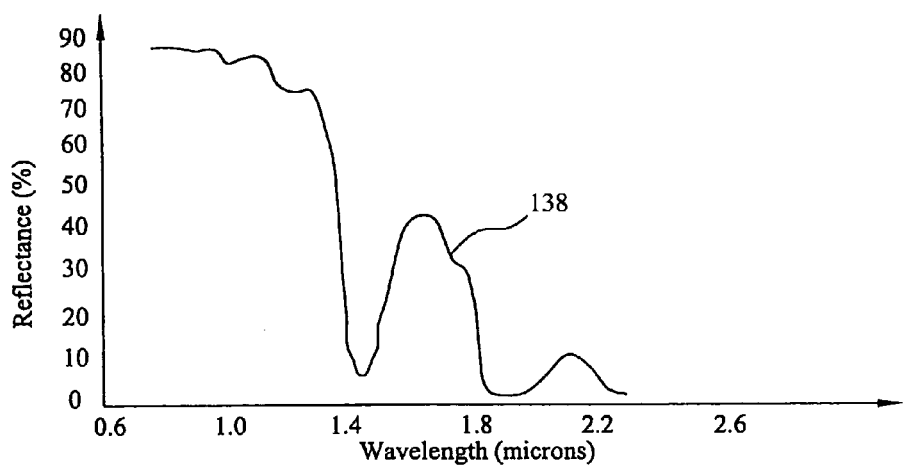

FIG. 17 is a graph of reflectance for distilled water.

Figure 18:
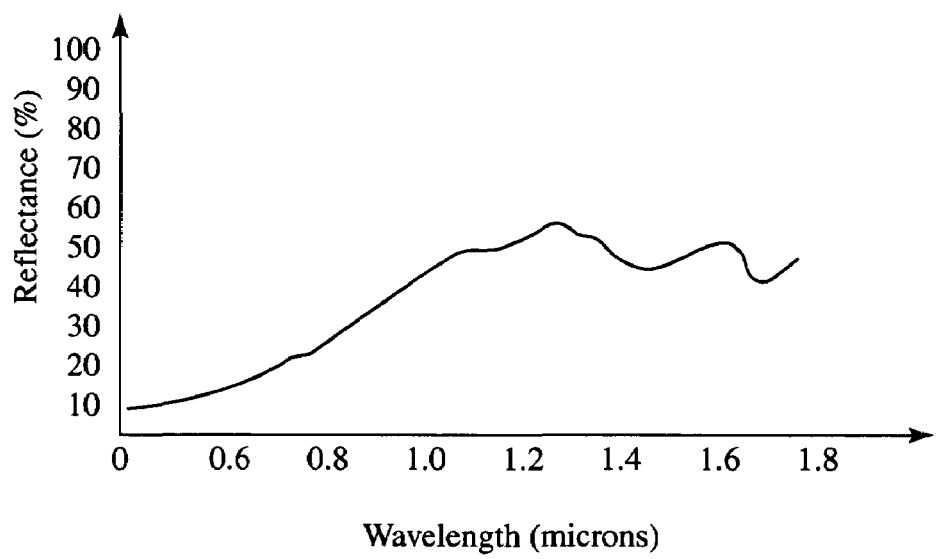

FIG. 18 is a graph of reflectance for natural human hair.

Figure 19:
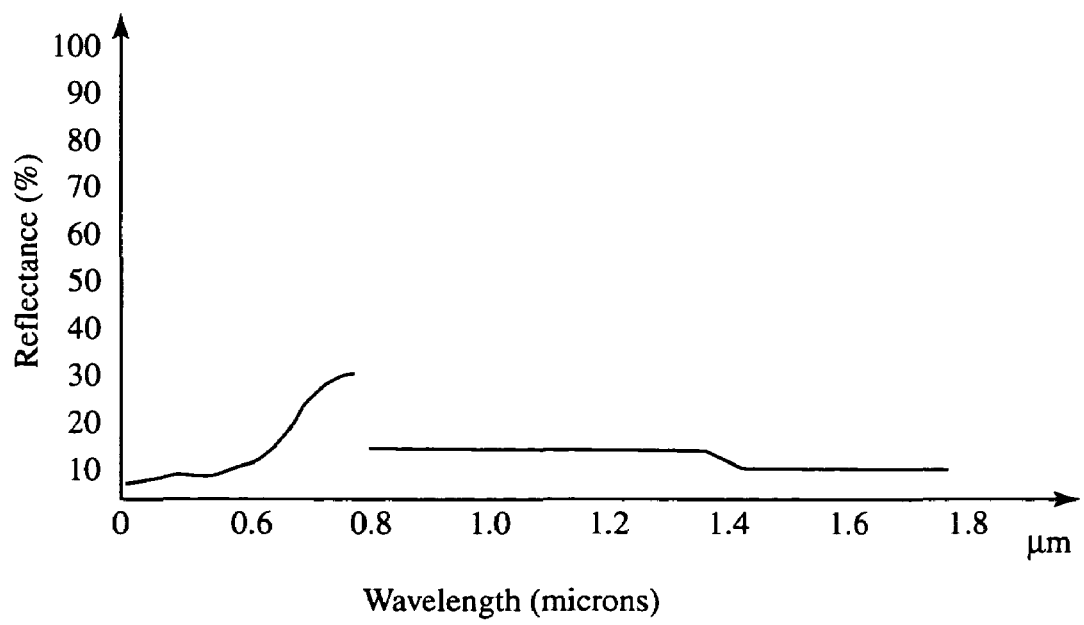

FIG. 19 is a graph of reflectance for a true human hair toupee.

Figure 20:
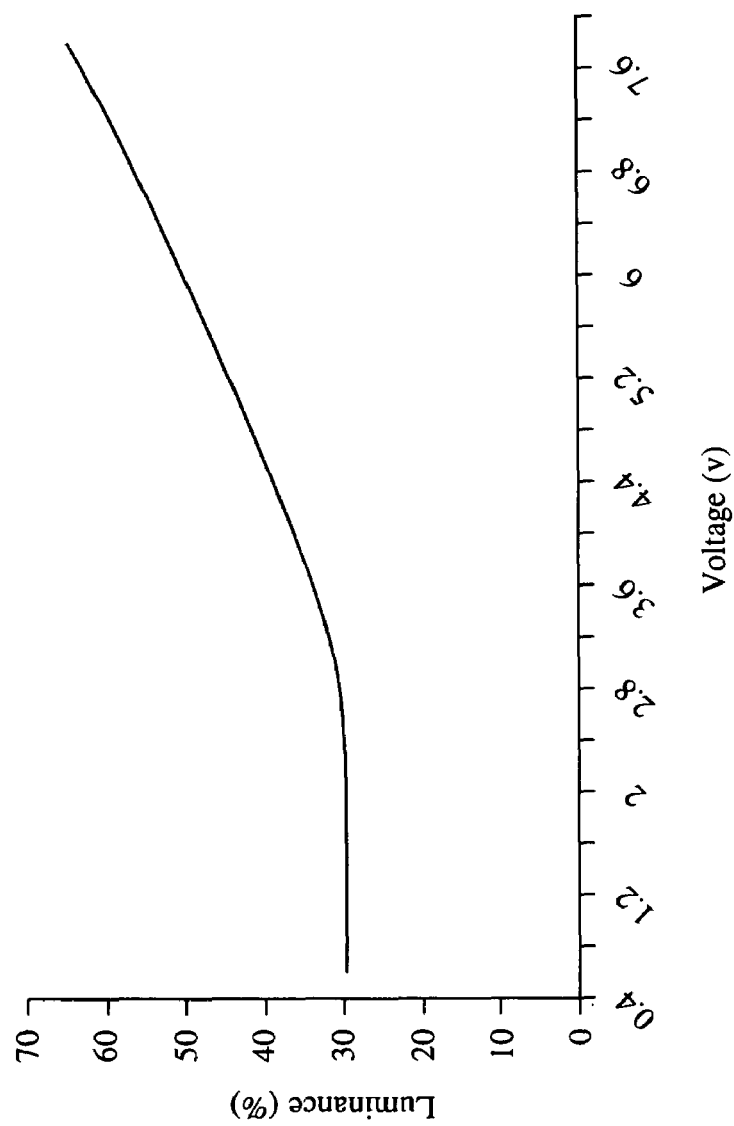

FIG. 20 is an illustrative graph showing the control of an infrared illumination source according to the present invention.

Figure 5:
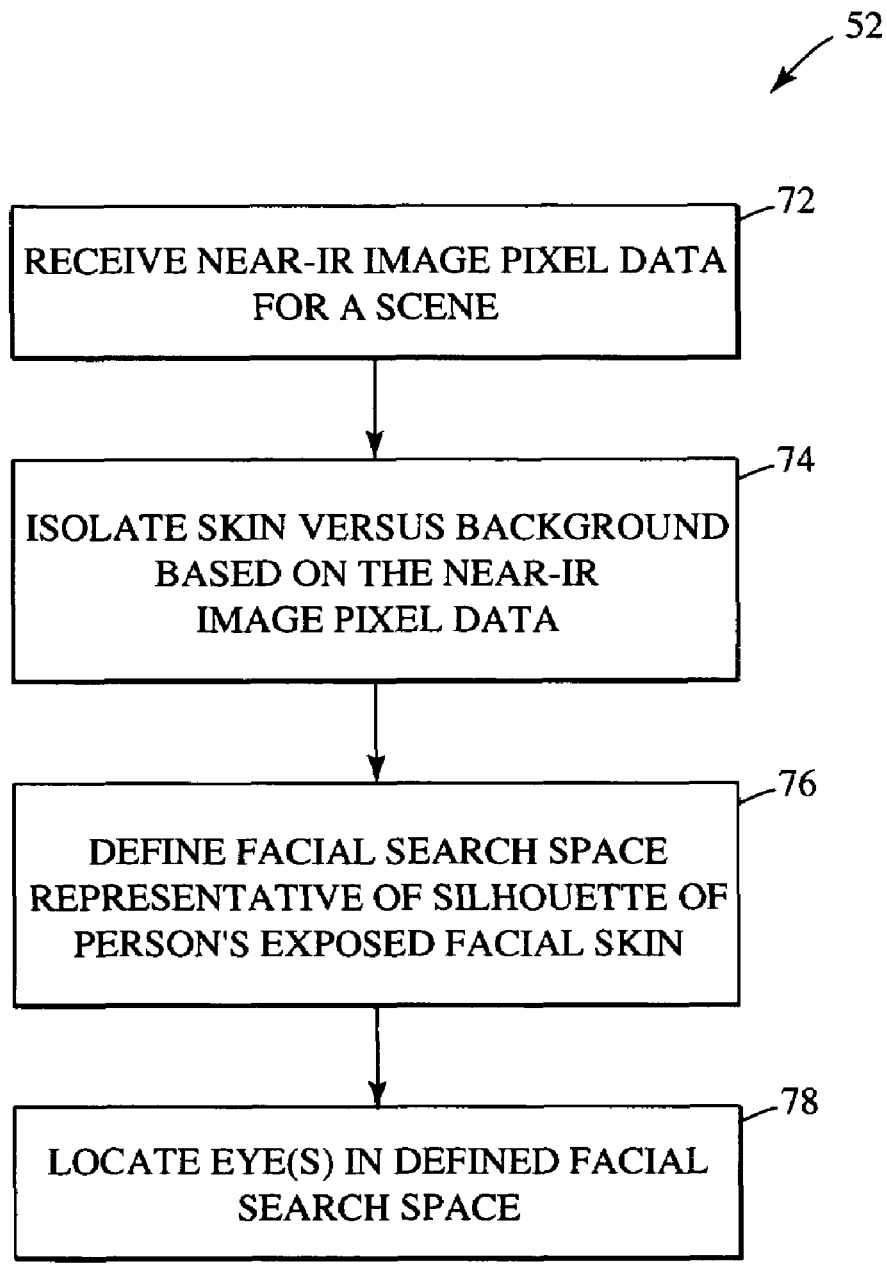
FIG. 5 shows one illustrative embodiment of a face detection process illustrated generally in FIG. 2 according to the present invention.
Figure 21:
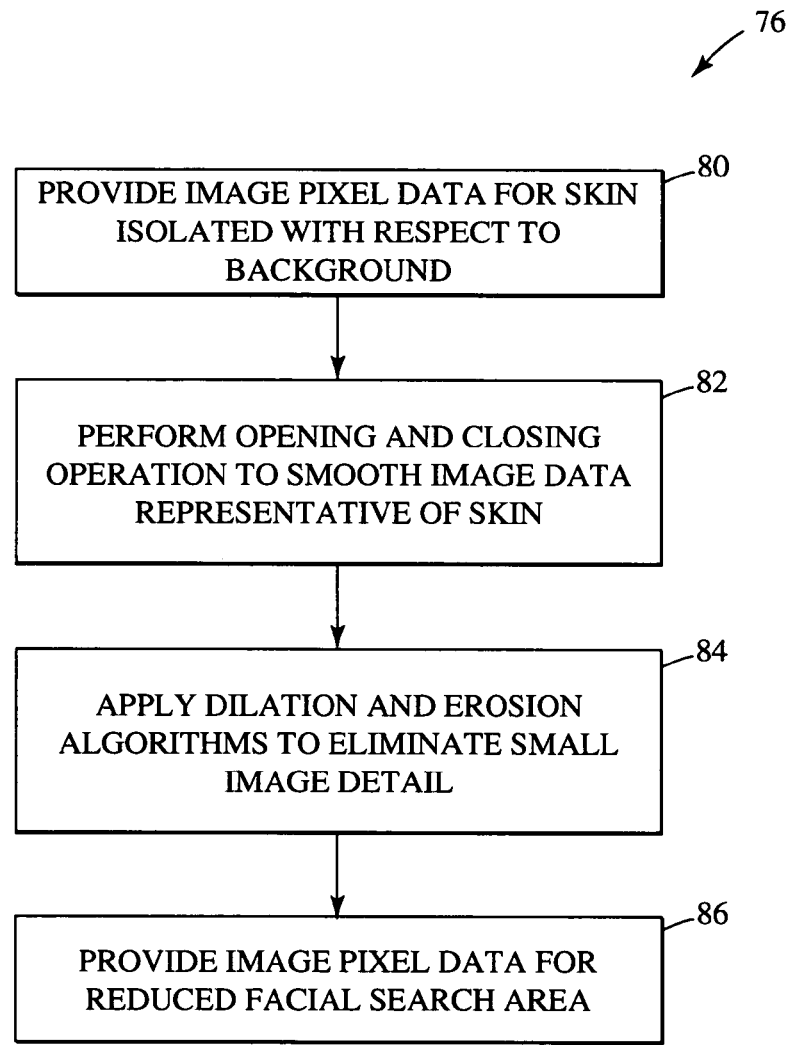

FIG. 21 is one illustrative embodiment of a method for further defining the facial search area as shown generally in FIG. 5 according to the present invention.

FIGS. 22a–22h are illustrations for use in describing the method for defining the facial search area as shown generally in FIG. 5, and more specifically in FIG. 21, according to the present invention.

Figure 23:
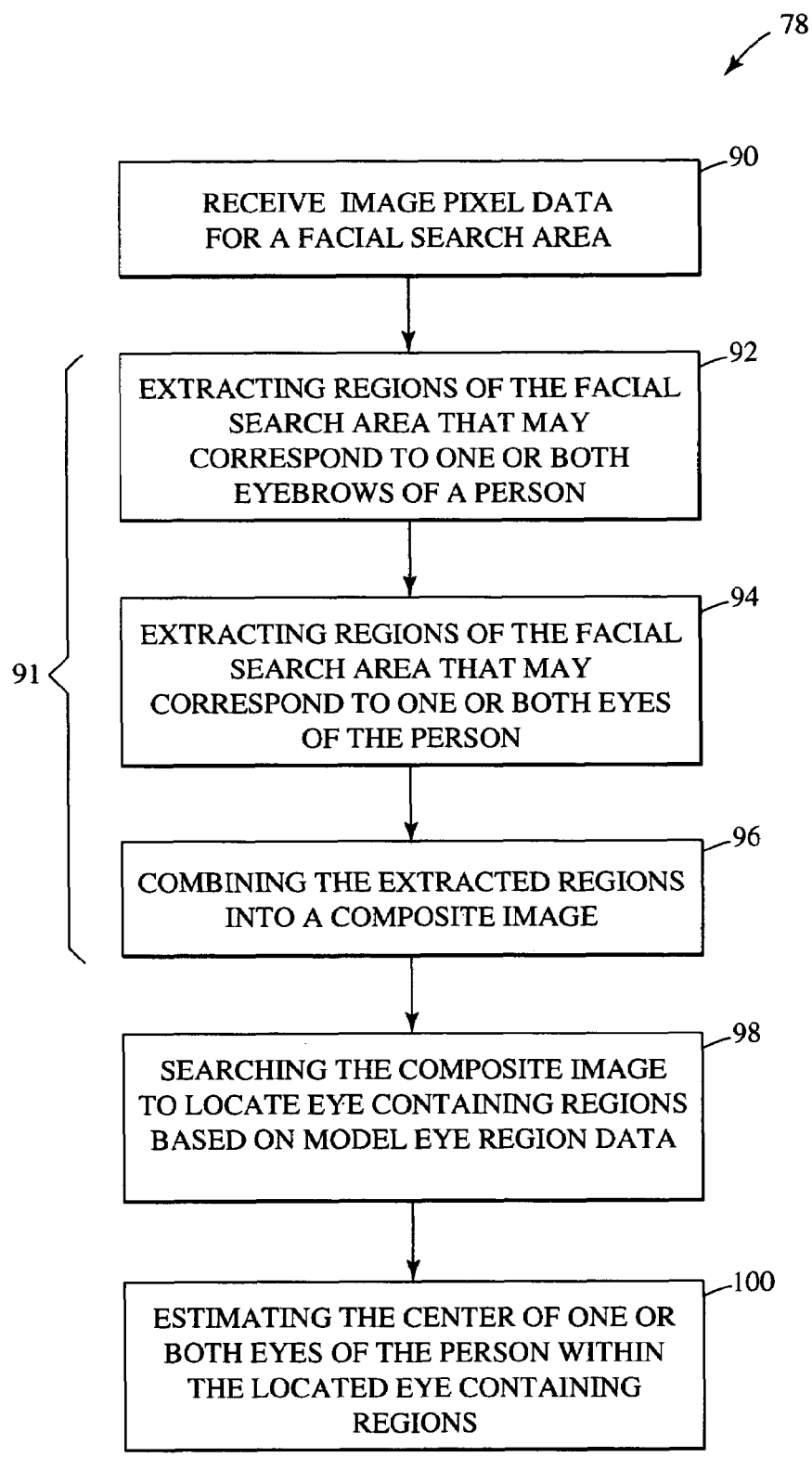

FIG. 23 is one illustrative embodiment of an eye location method shown generally in FIG. 5 according to the present invention.

Figure 24:
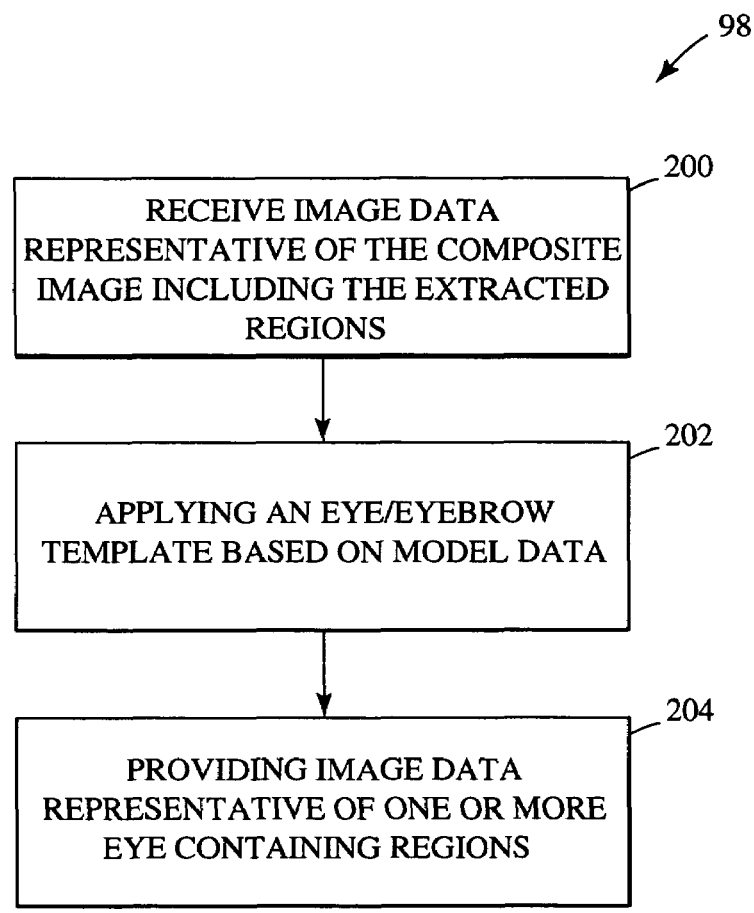

FIG. 24 is one illustrative embodiment of a search method for locating eye containing regions in the eye location method shown generally in FIG. 23 according to the present invention.

Figure 25:
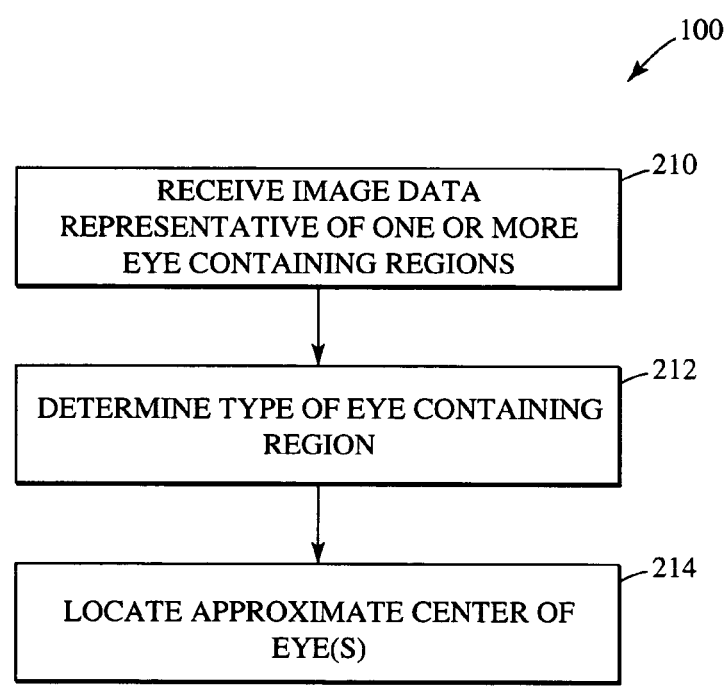
Figure 26:
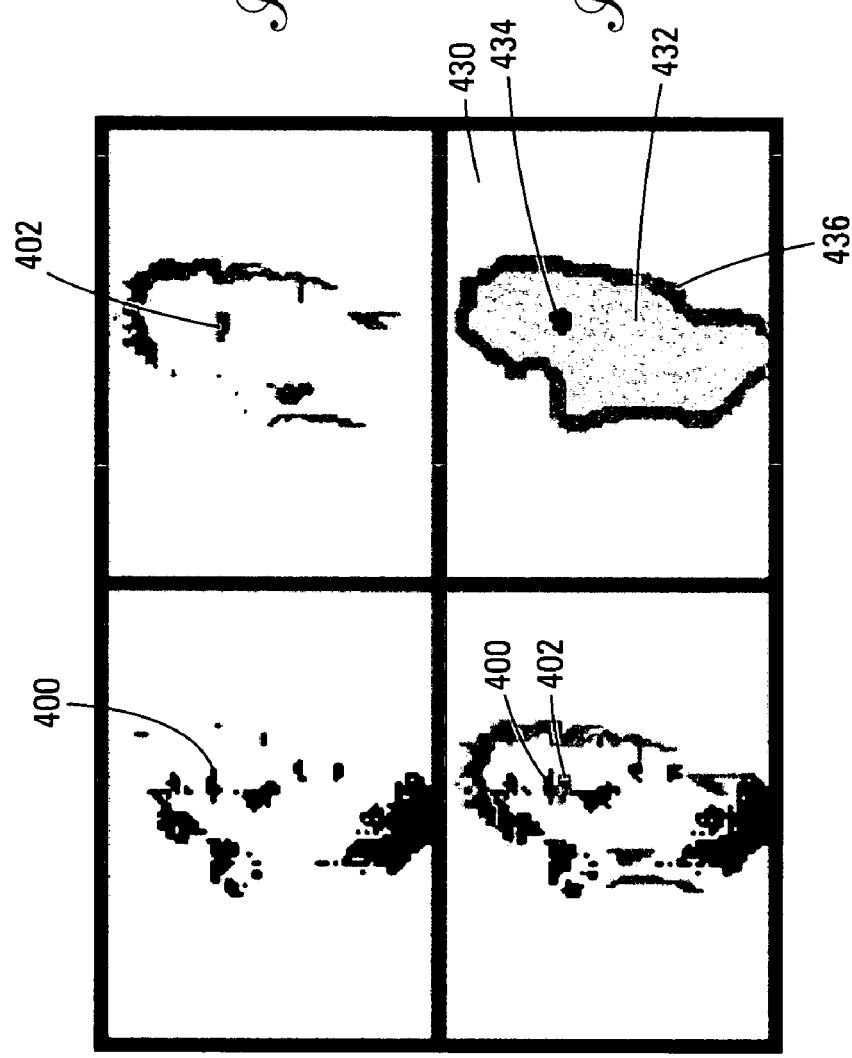

FIG. 25 is one illustrative embodiment of an approximation method for determining the approximate center of one or both eyes of a person in the eye location method shown generally in FIG. 23 according to the present invention.

FIGS. 26a–26d are illustrations for use in describing one embodiment of a method for extracting eye and eyebrow features in the eye location method shown generally in FIG. 23 according to the present invention.

Figure 27:
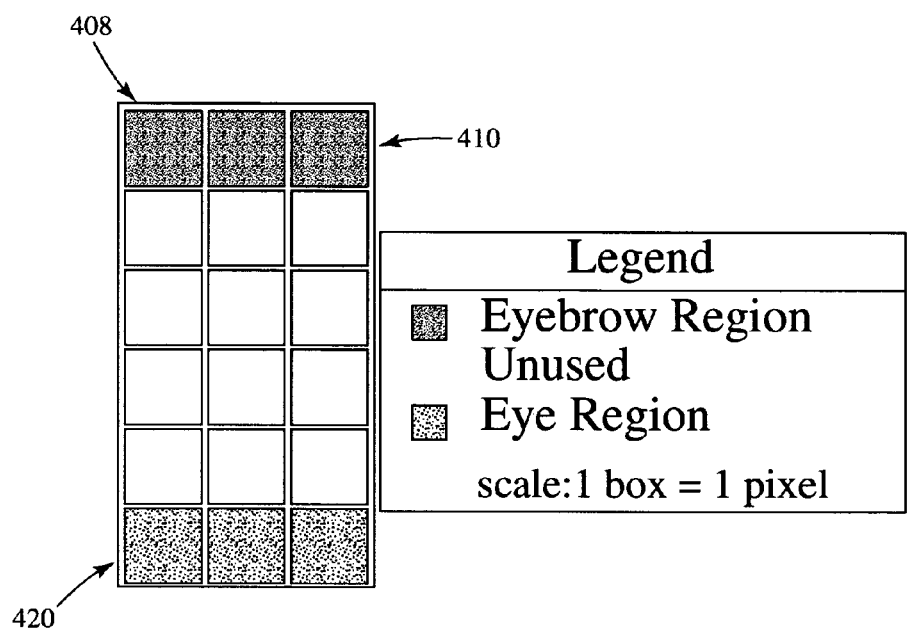

FIG. 27 is an exemplary illustration of a template for use in the search method for locating eye containing regions in the eye location method shown generally in FIG. 23, and also further described with reference to FIG. 24, according to the present invention.

FIGS. 28a–28c are illustrations for use in describing one embodiment of a method for determining the approximate center of one or both eyes of a person in the eye location method shown generally in FIG. 23, and also further described with reference to FIG. 25, according to the present invention.

DETAILED DESCRIPTION OF THE EMBODIMENTS

Various embodiments of methods and systems for use in face detection, e.g., such as in a preprocessing stage for use in face recognition, shall be described with reference to FIGS. 1–28. It will be recognized that various features and/or embodiments of methods and systems described herein may be used in combination and/or such methods and systems may be used in combination with other detection systems.

For example, in one illustrative embodiment of such a combined system according to the present invention, face detection may be used as a preprocessing stage for a face recognition algorithm that compares prestored image files representative of individuals to a current image that has been acquired and in which a face has been detected. On the other hand, the face detection system may be used as a preprocessing stage for other applications, e.g., counting of persons, determination of the orientation of a person's face to provide information as to whether the person is focusing on a particular object (e.g., a painting, a car, a television screen, a video camera, etc.).

Further, for example, such a combination system and/or method may be implemented using the two camera system described herein or may be used with image data representative of a scene provided in another manner.

Yet further, for example, in certain other embodiments of systems and methods according to the present invention, a person or a person's face may be detected and the location of a person's eyes may be performed with or without isolation of skin to define a facial search area. In other words, for example, the search area may be much larger than the region of the face when applying a template as described further herein.

In addition, such methods and systems may be used in combination with other systems and methods such as those that employ thermal infrared detection. Thermal or other near infrared detection may be used for detecting disguises. Likewise, visible spectrum systems may be used in combination with the methods and systems described herein so as to enhance detection capabilities.

Figure 1:
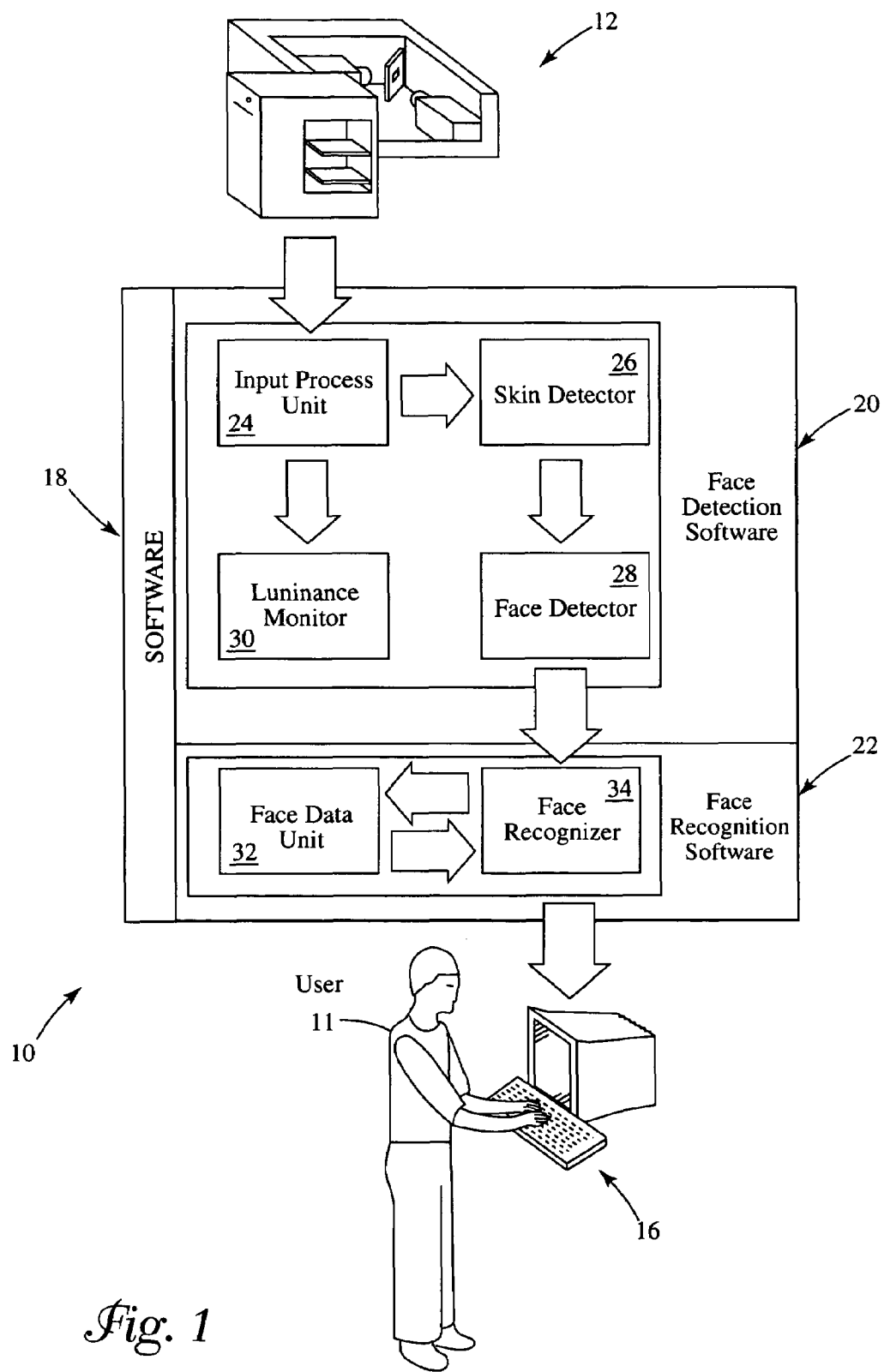
FIG. 1 shows a general illustrative near-infrared person identification system for identifying humans according to the present invention using face detection and face recognition.

Preferably, the face detection methods, apparatus and/or systems described herein according to the present invention are used as a preprocessing phase for a face recognition technique as shown in FIG. 1. FIG. 1 shows a person identification system 10 which is operable under control of a user 11 to implement face detection algorithms 20 of software 18 in a pre-processing stage prior to application of face recognition algorithms 22 of the software 18.

Figure 2:
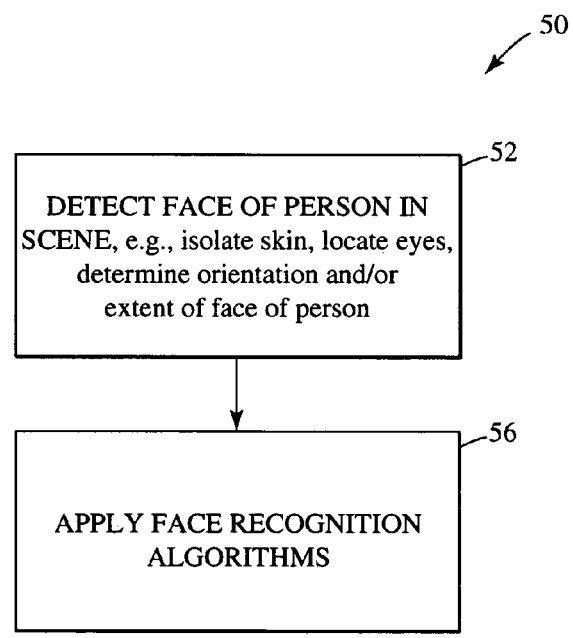
FIG. 2 shows a near-infrared person identification method including a face detection process that can be implemented by the system of FIG. 1 for detecting faces of humans according to the present invention.

As shown in FIG. 2, a person identification method 50 that can be implemented with the system 10 of FIG. 1 includes detecting a face that exists in a scene being monitored (block 52), e.g., determining the location of eyes of the face for use in defining the orientation and/or extent of the face. With such information available from the face detection process, other face recognition algorithms 22 can be used (block 56).

Figure 3:
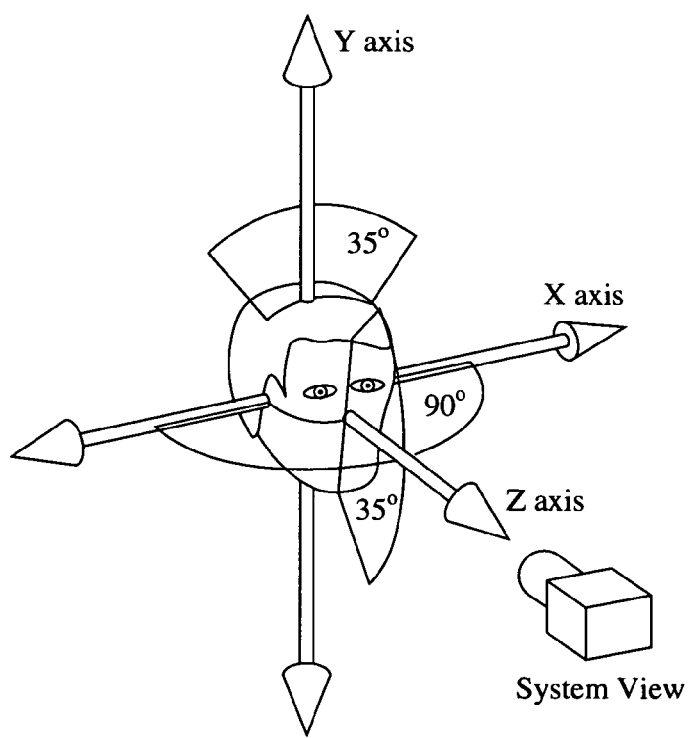
FIG. 3 shows an illustration for use in describing the possible orientation of a human head; which orientation can be at least partially estimated according to the present invention.

It will be recognized as shown in FIG. 3, that face detection must be effective when the head of person is at various positions relative to the imaging devices acquiring data with regard thereto. For example, as shown in FIG. 3, the head of a subject facing forward as well as most degrees of rotation must be considered. Such degrees of rotation shown by the head in FIG. 3 include head orientations within −35° to +35° range around the z-axis, within −35° to +35° range around the x-axis, and within −90° to +90° range around the y-axis.

The face detection process 52, e.g., sub-system, of the person identification system 10 includes imaging hardware system 12 and computer apparatus 16 operable to apply face detection algorithms 20 to image data provided by the imaging hardware system 12. After application of the face detection algorithms 20 and upon detection of a face of a person, image data representative of at least a portion of the person's face is provided to the face recognition system, e.g., visible image data, near-infrared data, etc., preferably with information determined as part of the face detection process. For example, data representative of the center of eyes of the face detected, and/or one or more other facial features, may be provided to the face recognition system to allow effective analysis of the image data representative of the currently detected face in the scene being monitored.

The face recognition algorithms 22 may be any algorithms used for identification of an individual or analysis of an individual's face, e.g., thermal analysis or near-infrared analysis to determine anxiety of a person. In the exemplary embodiment shown in FIG. 1, the face recognition algorithms 22 include a face data unit 32 for storing data representative of individuals, e.g., facial features, facial images, facial signatures, etc.

The face recognition algorithms 22 further include face recognition analysis tools 34 for analyzing image data concerning the face detected by one of more of the face detection techniques described herein. For example, the analysis tools 34 may be operable to compare stored data of face data unit 32 to features of image data provided regarding the detected face, e.g., visible image data, near-infrared image data, or any other data that may be beneficial in the identification of an individual or be beneficial in the assessment of an individual's intent, e.g., terrorist, smuggling, etc.

One or more of the face detection techniques described herein may be used to modify or be incorporated into currently available face recognition systems. In one exemplary embodiment, one or more of the techniques may be incorporated into a system that includes the face recognition engine facelt® available from Visionics (Jersey City, N.J.). Since facelt® relies primarily on facial geometry for face recognition, it can be invariably applied to visible as well as near-infrared imagery. In other words, the nominal face detector in the facelt® system may be replaced with the face detector according to the present invention.

Figure 4:
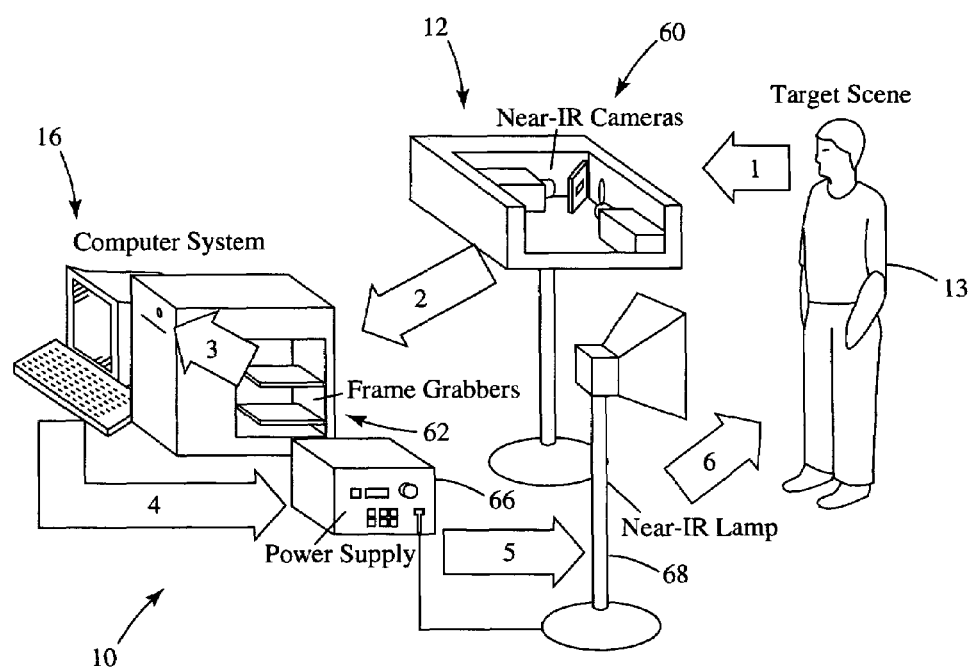
FIG. 4 shows an exemplary embodiment of a hardware system for implementing at least face detection according to the present invention.
Figure 9:
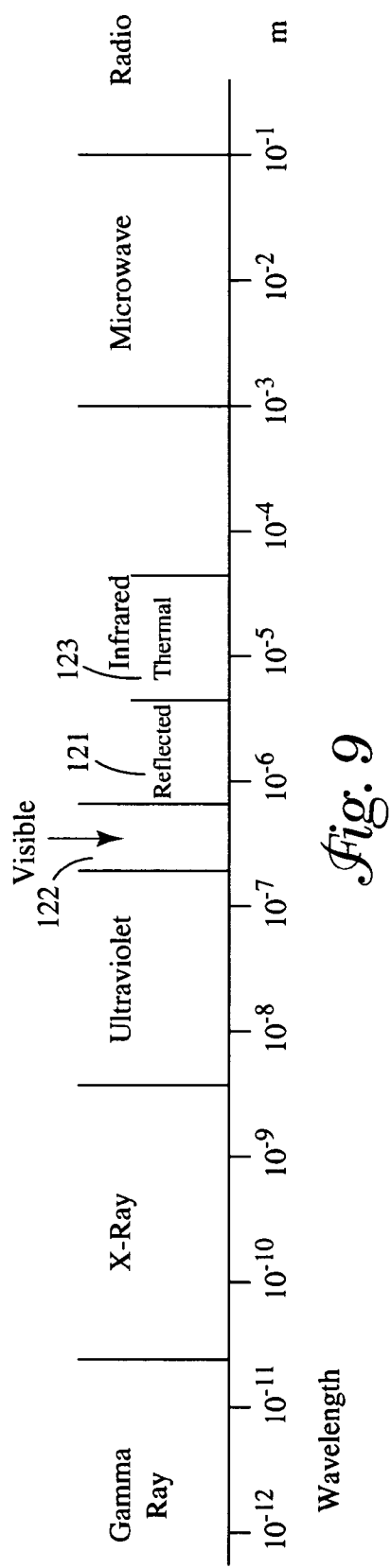
FIG. 9 is a graph of the electromagnetic (EM) spectrum.

Various imaging hardware system configurations 12 may be used in the implementation of the face detection process according to the present invention to provide near-infrared image pixel data for a scene (block 72 as shown in FIG. 5), However, preferably, as shown in FIG. 4, the imaging hardware configuration 12 includes a multiple near-infrared camera approach. More preferably, the system uses two cameras 60 as the input medium. The cameras 60 are preferably sensitive to the so called near-infrared spectrum in the range of about 0.9 microns to about 1.7 microns. This range clearly falls within the reflected portion of the infrared spectrum and has no association with thermal emissions as shown in FIG. 9 and described below. For example, the near-infrared cameras may be cameras available from Sensors Unlimited, under the trade designation SU-320.

The spectrums in which the cameras 60 function are within the reflected infrared portion 121 in FIG. 9, which shows the EM spectrum. Visible spectrum 122 is the spectral sensitivity of conventional cameras. Unfortunately, visible light cameras have noise levels that increase during poor environmental conditions such as bad weather, nighttime, and direct sunlight. Some problems, such as nighttime viewing may be overcome with artificial lighting, which matches the visible spectrum of the camera. However, this puts a person on notice that they are being monitored. Another disadvantage is that a human face 13, which is the object of interest, does not have consistent qualities within the visible range. Faces appear dark or light, depending on the physiological characteristics of the person, and the intensity and incident angle of illumination.

The thermal infrared band 123 is associated with thermal properties of materials. The human body is at a temperature of 37 degrees C. This means that human faces have a consistent light color in thermal infrared imaging, despite various facial colors, which is contrary to visible imaging.

In one preferred embodiment as will be further described below, the two cameras 60 are set at perpendicular angles and a beam splitter is used to allow both cameras 60 to view the scene from the same vantage point, yet in different sub-bands. The splitter divides the light reflected from the scene into a lower band beam of about 0.9 microns to about 1.4 microns in the near-infrared spectrum and the upper band beam of about 1.4 microns to about 1.7 microns. The two beams are funneled to the focal plane arrays (FPA) of the corresponding cameras 60. Each camera is connected to a frame grabber 62, which digitizes the incoming image data, e.g., video.

A luminance monitor component 30 of the software 20 running on the computer apparatus 16 with the frame grabbers 62, analyzes the luminance in the incoming frames of image data. The system can then control an illumination source 68, e.g., a near-infrared lamp to provide the desired illumination of the scene. For example, the system can appropriately adjust the output voltage on a programmable power supply unit 66 connected to the computer 16 via the serial port. The power supply 66 provides power for the near-infrared lamp 68 that illuminates the scene. Through this feedback, the system is able to keep the scene at a constant luminance regardless of external conditions.

In other words, a computer controlled near-infrared illumination source may be added to the system to maintain optimal illumination levels in the scene at all times. For example, a photometer may be used to sense scene illumination and provide a signal to initiate the need for computer adjustment of the illumination source. As opposed to constant illumination of the scene, the lamp 68 may be strobed when a subject gazes at the system unknowingly for too long.

Generally, the face detection algorithms 20 operable on the near-infrared image data provided by the imaging device hardware system 12, such as described above, includes four units or modules as shown in FIG. 1. The face detection algorithms 20 are operable for use in carrying out the face detection method 52 shown in FIG. 5.

The face detection method 52 includes receiving near-infrared image pixel data for a scene, or in other words, recognizing the near-infrared image data provided by the imaging device hardware system 12 (block 72). Skin in the scene is isolated versus background based on the near infrared pixel data and is indicative of a face in the scene (block 74). Thereafter, if skin is isolated in the scene, a facial search area or space is defined that limits the region of the scene in which a search for eyes of a person needs to be conducted (block 76). For example, the facial search space may be refined by various imaging techniques to present a search space representative of a silhouette of the detected person's exposed facial skin. After the facial search space has been defined, an eye location process is applied to locate the eyes in the defined facial search area (block 78).

The input process unit 24 is preferably operable to acquire the input images for both upper and lower near-infrared bands from the frame grabbers 62 (block 72). The images are then aligned and sent to the luminance monitor 30 and the skin detector module 26.

The luminance monitor 30, as described above, evaluates the current luminance level in the scene and dynamically adjusts the power output on the power supply 66. A simple mapping between the output voltage and the corresponding luminance as shown in FIG. 20 allows the system to accurately achieve the desired light level in the scene.

Upon receiving the dual input images, generally, the skin detector module 26 performs a series of operations to isolate the skin in the image data (block 74 and block 76). For example, the output of the skin detection module 26 may be a binary image where all skin appears black against a white background. This image is then passed to the final unit of the face detection software 20, the face detector module 28.

Generally, the face detector module 28 locates one or both eyes of the face such that, for example, orientation of the face can be determined. For example, in one embodiment a template process is used on a composite feature image extracted from the dual near-infrared images and the skin image to provide a good approximation of the location of the eyes. Based on the location of the eyes and/or skin, the orientation and extent of the face can be determine heuristically. Such determination can be performed employing certain known orientation characteristics, such as, for example, as described below.

For example, a normal line can be defined extending in the y-axis direction (see FIG. 3) orthogonal to the z-axis which splits the eyes of the face being detected. If the person is facing directly forward, generally the normal line will be equidistant between the eyes detected. However, if the person is turned, e.g., head rotated slightly around the y-axis, then one eye will be closer to the normal line than the other.

Similarly, for example, a normal line can be defined extending in the x-axis direction (see FIG. 3) orthogonal to the y-axis which splits the face into an upper and lower region along the level eyes on the face. The eyes are generally located at a certain position on the face, e.g., with ⅓ of the face above the eyes and ⅔ of the face below the eyes, or in other words below the normal line. If the person is facing directly forward, generally (at least in the example line provided above) ⅓ of the skin detected will be above the normal line and ⅔ below the normal line. However, if the person's head is leaning forward or backward e.g., head rotated slightly around the x-axis, then a different ratio of skin above the normal line and skin below the normal line will be apparent. For example, such analysis may be used to eliminate portions of detected skin associated with the neck.

Preferably, computer apparatus 16 includes a computer system operable to execute software to provide a user with functionality as described herein. Although the functionality may be implemented using software executable using a computer apparatus, other specialized hardware may also provide the functionality, e.g., face detection. As such, computer apparatus as used herein includes not only circuitry such as processors capable of executing various software processes, but may also include specialized hardware.

For example, the computer system 16 may be any fixed or mobile computer system, e.g., a personal computer. The exact configuration of the computer system is not limiting and most any device capable of providing suitable computing capabilities may be used according to the present invention. Further, various peripheral devices, such as a computer display, a mouse, a keyboard, memory, printer, etc., are contemplated to be used in combination with a processing apparatus of the system.

With further reference to the receipt of near-infrared image data (block 72) for the face detection method 52 of FIG. 5, various exemplary embodiments of providing such near-infrared image data and the information that can be obtained using such data shall be described with reference to FIGS. 6–19. The near-infrared spectrum is particularly beneficial for skin detection purposes as has been previously described in U.S. patent application Ser. No. 09/389,925 filed 3 Sep. 1999 and entitled "Near Infrared Human Body Detection Method & System" and U.S. patent application Ser. No. 09/732,236 filed 7 Dec. 2000 and entitled "Near-Infrared Disguise Detection."

Human skin exhibits an abrupt change in reflectance around 1.4 microns. This phenomenology allows for highly accurate skin mapping by taking a weighted difference of a lower band near-infrared image and an upper band near-infrared image. One advantageous consequence of the phenomenological basis of the skin detection or isolation method is that artificial human heads or disguised heads cannot fool the system.

Figure 6:
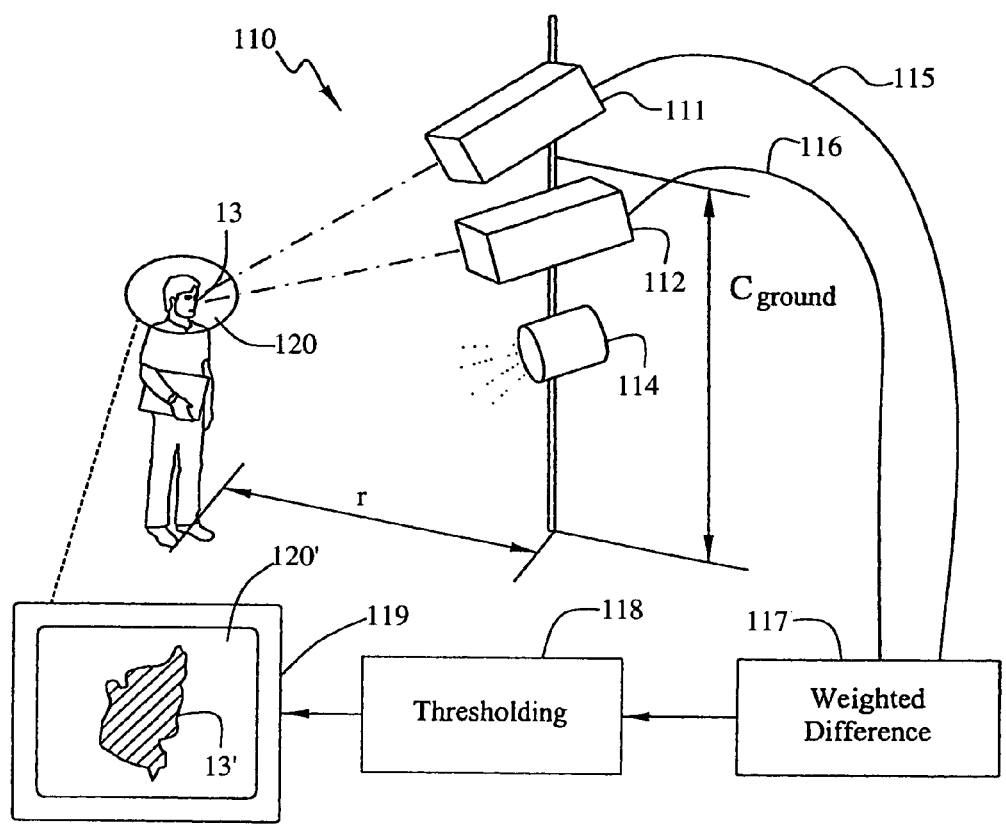
FIG. 6 shows one embodiment of a near-infrared skin isolation system for use in defining the facial search area as illustratively shown in FIG. 5 according to the present invention.

FIG. 6 shows a basic layout of a near-infrared fusion system 110 for use in detecting humans, e.g., facial regions thereof, and/or isolating skin of a face of a person. It is a dual-band imaging system. Two co-registered cameras 111 and 112 sense the image of, for instance, a face 13 of a human being in a scene. Camera 111 preferably has a spectral sensitivity of about at least 0.8 microns to 1.4 microns. Camera 112 has a spectral sensitivity of 1.4 microns to at least about 2.2 microns. Slightly shorter or longer ranges can also yield acceptable detection results. The 1.4 micron threshold point between the two bands of spectral sensitivity is a preferable demarcation point for the dual-band system 110, but may be another value as appropriate. Each of the camera sensitivity band ranges can cross somewhat the 1.4 micron wavelength without diminishing the human or skin detecting ability of system 110.

The quality of the imaging signals from cameras 111 and 112 remain high even during overcast days and at nighttime because the scene being scanned by cameras 111 and 112 can be illuminated with an eye-safe near-infrared illuminator 114. Since the eye is not sensitive to the near-infrared spectrum, system 110 can remain stealthy all of the time, whether in a detection mode or not. Ideally, the camera at the lower band range (e.g., 0.8 to 1.4 microns) should be an image intensifier. Therefore, the illuminator's spectral emission specification needs to match only with the upper band range (e.g., 1.4 to 2.2 microns). Near-infrared cameras 111 and 112 provide clear imaging signals even in foul weather conditions such as hazy conditions. These particular infrared bands of detection and illumination provide for sufficient light transmission through windshields, side windows, fog, and darkness. This permits adequate detection of humans in various circumstances, for example, behind glass, in vehicles, at night and in poor weather.

The image outputs 115 and 116 of cameras 111 and 112, respectively, go to a weighted difference software process 117 or specialized hardware that fuses the outputs by performing weighted subtraction of the intensities of the two camera images. This weighted difference software or hardware may be referred to as a fuser. Such fusion of the camera outputs intensifies the silhouette of face 13 and other exposed human skin in the resultant fused image. Also, the image features a diminution of the background of the scene being covered by the cameras. This increased contrast between the person and the background in the fused image permits essentially perfect image segmentation through thresholding by a software process 118, or specialized hardware. This thresholding software or hardware may be referred to as a thresholder. The output of the thresholder 118 may go to a display 119, printer, or a post-process or specialized hardware.

A final processed image shows the exposed skin parts, such as face 13, as binary blob 13', as shown in FIG. 6. Background 120 of sensed face 13 is discounted as shown by blank background 120' in display 119. In other words, a clean-cut binary imagery of face 13' indicative of facial skin ensures reliable detection of the existence of a face in the scene.

Figure 7A:
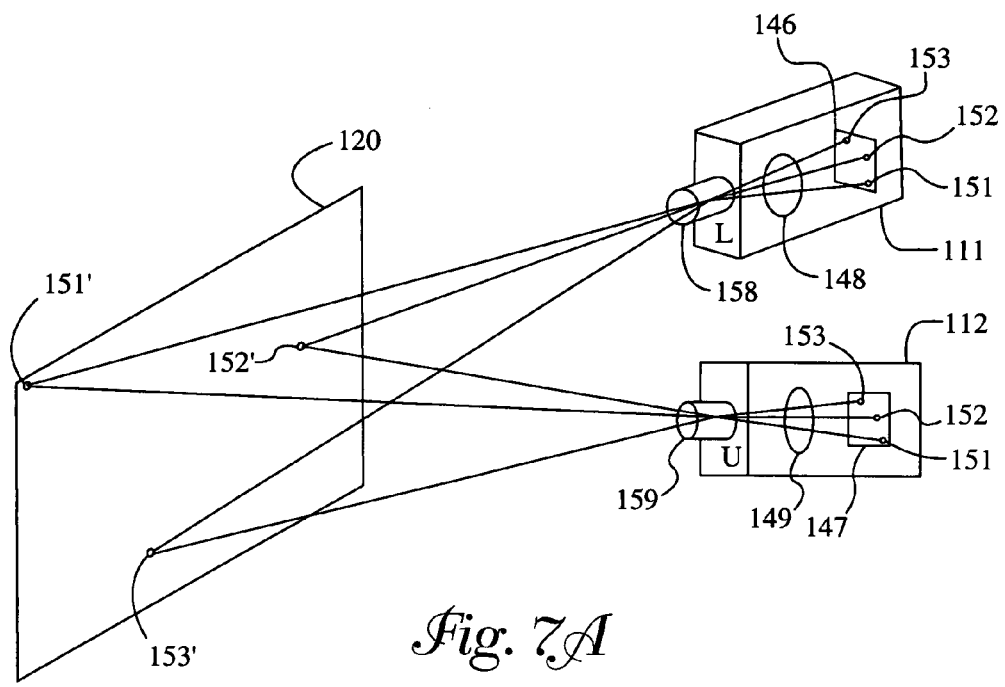
FIG. 7A illustrates a co-registration scheme for two cameras.

FIG. 7A illustrates the co-registration of cameras 111 and 112. There is spatial and time registration between the cameras. The cameras could be of the same make and model. The necessary difference between the cameras is the optical bandwidth filters, 148 and 149, which are situated between sensing arrays 146 and 147 and camera lenses 158 and 159, respectively, of cameras 111 and 112. Filter 148 determines the 0.8 to 1.4 micron spectral sensitivity of array 146 in camera 111 and filter 149 determines the 1.4 to 2.2 micron spectral sensitivity of array 147 in camera 112.

A polarizer may be inserted in front of lens 158 of camera 111 and in front of lens 159 of camera 112. Instead, a polarizer may be inserted between lens 158 and array 146 of camera 111, and between lens 159 and array 147 of camera 112. Sensing arrays 146 and 147 of the cameras are the same size, for example, 512 by 512 pixels in a gallium arsenide substrate.

Typically, the fields of view are the same for each array. Three pixels 151, 152, and 153, for example, are selected out for spatial co-registration. Each of the three pixels are focused on corresponding portions 151', 152', and 153', respectively, of image 120 viewed by cameras 111 and 112. That means the arrays have the same images, pixel for pixel, even though the spectral sensitivities are different. In other words, the columns and rows of pixels are aligned with the physical world scene, pixel for pixel. Once spatially co-registered, cameras 111 and 112 are kept stationary relative to the physical world.

Time co-registration of the cameras means that the cameras are in synchronization with each other from a signal perspective. The signals for each of the two corresponding pixels go to a frame buffer at the same time. The retention of light for each pixel is in the micro-second range. A typical frame time is about 33 milliseconds, which is 30 frames per second. The transfer of pixel data may be parallel, line-by-line, or serial, pixel-by-pixel, or any other style of information transfer. There is a sync signal for cameras 111 and 112 to initiate and maintain their time co-registration.

The image outputs or pixel signals 115 and 116 go to a software process or specialized hardware 117 which provides a certain weighting to each of the pixels and fuses pairs of corresponding pixels from cameras 111 and 112, respectively, into single pixels. The weighted differencing is performed pixel by pixel. Each result is the fused pixel of the two weighted differenced pixels. The weight difference equation for such fusing is $$P(i,j)_{fused} = P(i,j)_{lower\ band} - C*P(i,j)_{upper\ band}.$$

P is spectral power. The position or location of each pixel in the respective image is identified by row (i.e., "i") and column (i.e., "j"). The rows and columns of pixels of the images of cameras 111 and 112 coincide with each other. The lower band pixels are those from camera 111 and the upper band pixels are those from camera 112. The spectral power "P" for each pixel at i,j is indicated, for example, by a numeral scale of brightness from 0 to 255 for 8-bit resolution. "0" is entirely black or dark (i.e., no spectral power) and "255" is entirely white or bright (i.e., full spectral power). Numerical indications in between 0 and 255 are, of course, representative of various gradations of gray, brightness, or spectral power. "C" of the equation is a constant (i.e., weighting factor), which is determined according to the lighting of background or scene 120 and object or face 13.

"C" for daytime lighting conditions is about 3 for optimal results. "C" for nighttime depends upon the spectral distribution and properties of an artificial illuminator 114.

The brightness or spectral power of a typical pixel of the lower band (image 146) may be 55 and the brightness or spectral power of the corresponding typical pixel of the upper band (image 147) may be 10. These upper and lower band pixel values are representative of skin in the corresponding bands. The spectral power of a resulting typical fused pixel, in daytime viewing, at a location of row i and column j in the daytime is determined with the following calculation.

$$P(i,j)_{fused} = 55 - 3*10$$

$$P(i,j)_{fused} = 55 - 30 = 25$$

The fused pixel signals go from software process or specialized hardware 117 to software process or specialized hardware 118 for image segmentation via thresholding of the fused pixels. Process or specialized hardware 118 emulates a comparator-like circuit in that each fused pixel below a certain threshold value (T) is assigned a value ($V_1$) of 0 and each fused pixel above the certain threshold value is assigned a value ($V_2$) of 255.

Figure 8:
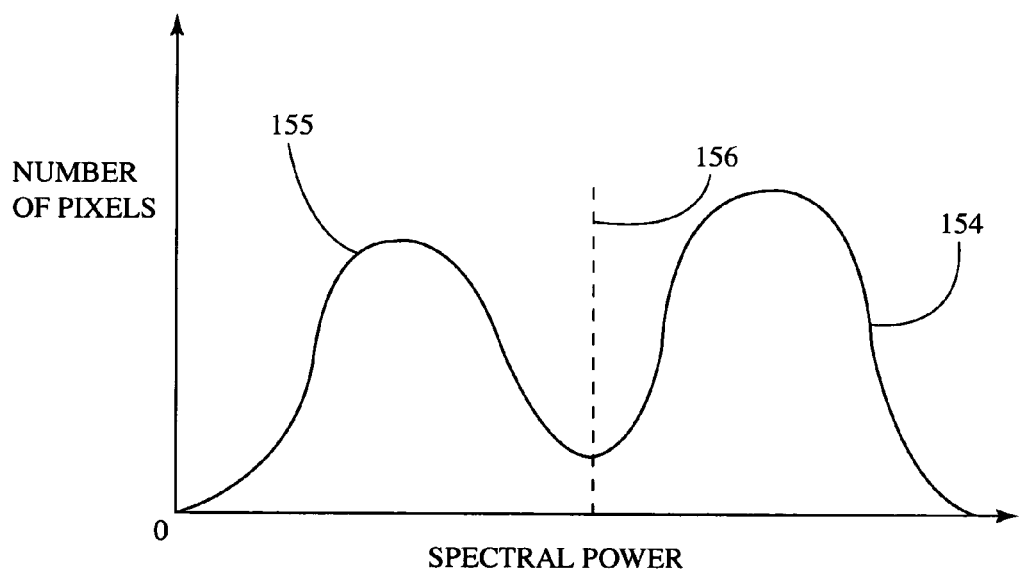
FIG. 8 is a histogram of the number of pixels versus spectral power for an image frame.

FIG. 8 shows a histogram of an image frame of fused pixels. The number of pixels for each spectral power value is indicated by curves 154 and 155 for a given sensed image. The pixels of curve 154 represent background 120 and the pixels of curve 155 represent human skin 13. Curves 154 and 155 intersect at 156 that is deemed to be the appropriate value for thresholding. If curves 154 and 155 do not intersect, then the thresholding value 156 is centered between curves 154 and 155. The threshold value is dynamic in that it changes from frame to frame, and is determined for each image frame according to the histogram of the respective frame. If the spectral value for thresholding is 20, then fused pixels having a value below 20 are valued at 0 and fused pixels having a value above 20 are valued at 255. The resulting image in display 119 has white pixels for background 120' and black pixels for face 13'. This image may be reversed by process or specialized hardware 118 such that background 120' has black pixels and face 13' has white pixels.

Figure 7B:
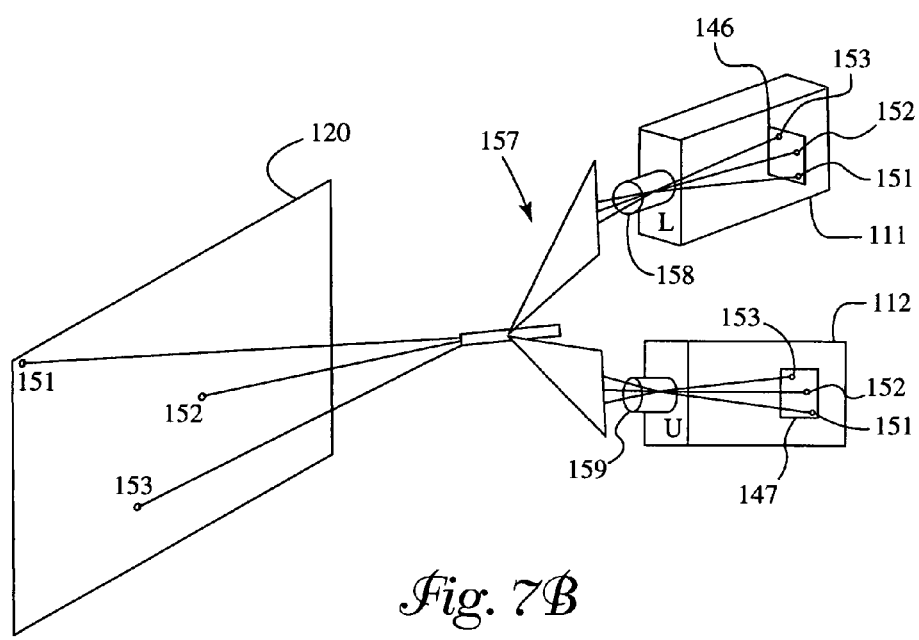
FIG. 7B shows an alternate embodiment for co-registration of the cameras.

FIG. 7B shows an alternate embodiment for co-registration of the cameras 111 and 112. As shown therein, an optical device 157, e.g., a beamsplitter/filter device, is used to provide co-registration of the cameras. The setup is essentially the same as that shown in FIG. 7A, except that the filters 147,148 are not provided with the cameras 111 and 112. Instead, filtering is provided by the optical device 157.

As shown in FIG. 7B, light comes from the environment through the beamsplitter/filter optical device 157 to the two near infrared cameras 111 and 112 as represented by the points of light 151–153. The beamsplitter/filter optical device 157 is an optical device with a coating that performs optimally at a specific angle. The beamsplitter/filter optical device 157 directs light with wavelengths below 1.4 microns (i.e., the lower band) to camera 111 and light with wavelengths above 1.4 microns (i.e., upper band) to the other camera 112. The cameras 111, 112 are preferably connected to a computer for processing video information. However, another electronic device or a human operator may be used as an alternative to, or in addition to, the computer device. The lower and upper bands are bounded either by the beamsplitter/filter optical device's 157 sensitivity or the camera's 111, 112 sensitivity. For example, the lower band may be 0.8 microns to 1.4 micron, and the upper band may be 1.4 microns to 2.4 microns. However, other somewhat different ranges may work as well.

The beamsplitter/filter optical device 157 provides at each point in time, two co-registered frames in the upper and lower band at the hardware level of the system. Therefore, no time-consuming and generally complicated software to accomplish time registration is required like in the embodiment described above with reference to FIG. 7B.

The spectrums in which cameras 111 and 112 function are within the reflected infrared portion 121 in FIG. 9, which shows the EM spectrum as previously described herein. FIG. 10 reveals the transmittance characteristics of infrared light between 0.4 and 2.8 microns for a clean vehicle windshield (curve 124) and a dirty windshield (curve 125). Beyond 2.8 microns of thermal infrared bandwidth 23, the radiation transmittance characteristic of windshield glass is almost zero. The transmittance of a lightly tinted side window of a vehicle is good (50 to 85%), from 0.3 up to 2.8 microns as revealed by curve 126 in FIG. 11. Between 2.8 and 4.3 microns, the radiation transmittance is about 20 percent for the side vehicle window. Beyond 4.3 microns the transmittance drops to nearly zero. However, the spectral behavior of the side window permits transmittance of some thermal radiation. In view of such information, it can be seen that face detection of the present invention which uses the near-infrared spectrum may be used for detection of persons behind a glass barrier, e.g., a ticket booth, an airport glass barrier, etc.

Curves 127 and 128 of FIG. 12 show the percentage of reflectance of infrared light for light and dark complexion Caucasian males, respectively. The reflectance is good between 0.6 and 1.4 microns. Above 1.4 microns, the reflectance is significantly diminished. However, the difference of reflectance of light and dark complexions are minimal.

In FIG. 13, curves 129 and 130 show skin reflectance for light and dark complexions, respectively, of Asian males. Curves 131 and 132 of FIG. 14 show skin reflectance for light and dark complexions of black males. Even though the reflectance of light complexions is higher than those of dark complexions; curves 127, 128, 129, 130, 131 and 132 of FIGS. 12–14, respectively, have similar shapes and all of them drop off at about 1.4 microns. These reflectances show some variation for all complexions of the Caucasian, Asian, and black males, between 0.6 and 1.4 microns.

Curves 133 and 134 of FIG. 15 show the reflectance for more extreme differences of light skin and dark skin, respectively. The reflectance of light and dark skin are significant up to 1.4 microns. After 1.4 microns, reflectance curves 133 and 134 for light and dark skin, respectively, become almost coincident and the resultant reflectance drop below 20 percent. Thus, in the near-infrared bands of 1.4 and above, the reflectance of detected humans of all kinds of skin shade, are about the same at wavelengths greater than 1.4 microns.

In FIG. 16, curves 135, 136, and 137 show the reflectance for cotton, wood, and polyamide respectively, to be significant not just between 0.6 and 1.4 microns, but beyond 1.4 microns. The insignificant drop in reflectance after the 1.4 micron threshold point, is a basis that shows a large contrast in reflectance between the human face, e.g., skin, and inanimate objects, e.g. background, such as upholstery, the dashboard, and fabrics in a vehicle, which are background, and provide for easy detection of the human face, e.g., skin, in the range of 1.4 to 2.2 microns.

Consequently, there is a significant contrast, in reflectance between the images of a Caucasian male and a dummy head and/or background from a camera operating in the range between 1.4 and 2.2 microns. The image of the dummy is reflective and appears rather bright and the male human image is dark and thus the resultant contrast between the two images is rather stark.

This person detection, e.g., skin detection, scheme is much superior to visible light imaging, since the latter scheme reveals little or no contrast between the Caucasian and dummy heads of like colors. In summary, it is easy to distinguish images of the human head from those of the dummy head in the 1.4 to 2.2 micron range imagery, but not easy to distinguish the images of the respective heads from each other in the 0.8 to 1.4 micron range imagery.

The lower reflectivity of human skin for the 1.4 to 2.2 micron spectral range is explained by the spectral reflectance of distilled water as shown by curve 138 of FIG. 17. There is a substantial drop in reflectance at about 1.4 microns. Beyond 1.4 microns, the water absorbs substantial infrared radiation and appears in an image as a dark body. Since the composition of the human body consists of 70 percent water naturally, its spectral response is similar to that of water. So camera 112, operating in the 1.4 to 2.2 micron range, captures this unique human body differentiator. With the operating range of camera 112, one can safely use during nighttime a matching near-infrared illumination source 114 to improve the quality of the sensed image of face 13. This light is invisible to humans, but also is harmless to their eyes since the wavelength of illuminator 114 is above the safe threshold of 1.4 microns.

Further, with reference to several previous Figures, and also FIGS. 18–19, reflection properties of natural human anatomy (e.g., natural skin and hair) in the upper band of the near-infrared spectrum are described. For example, such properties can be used for skin detection or isolation thereof from background or other artificial materials associated therewith.

The human skin has extremely low reflectance in the upper band of the near-infrared spectrum (i.e., 1.4 μm and greater in the near infrared spectrum) as previously described herein with reference to FIG. 12–15. Such FIGS. 12–15 showed that human skin has a high reflectance between 0.6 and 1.4 microns. However, above 1.4 microns, the reflectance is significantly diminished. Since almost everything else in a typical scene has a higher reflectance in the upper band of the near-infrared spectrum greater than 1.4 μm, there is sharp contrast between the human skin, e.g., face and neck, and the background.

Further, as shown by FIGS. 12–15, the skin reflectance property, i.e., that the reflectance of human skin above 1.4 microns in the upper band of the near infrared spectrum is significantly diminished, is universal across the human race, e.g., there is little difference in such reflectance properties above 1.4 microns in the upper band of the near infrared spectrum when comparing Caucasian, asian, and black persons. For example, FIG. 10 shows a drop-off in reflectance at or about 1.4 microns for Caucasian males, FIG. 11 shows such a drop-off for asian males, FIG. 12 shows such a drop-off for black males, and FIG. 13 shows the drop-off for extreme differences of light skin and dark skin. As such, and as previously described herein, in the near-infrared band of 1.4 and above, the reflectance of natural skin of detected humans of all kinds of skin shade are about the same at wavelengths greater than 1.4 microns.

In contrast to the natural skin, human hair, i.e., natural hair, is highly reflective in the upper band of the near infrared spectrum above 1.4. Such reflectance is also a property that is universal across the human race. The highly reflective nature of human hair in the upper band of the near infrared spectrum above 1.4 microns is generally shown in FIG. 18. In FIG. 18, a reflectance diagram of natural human hair in at least a portion of the near-infrared spectrum is shown. Three separate reflectance measurements on a natural human hair specimen produced the high reflectance properties shown in the diagram.

In contrast to the high reflectance of natural human hair, a reflectance diagram of a human hair hairpiece (an artificial material as later defined herein) is shown in FIG. 19. Such is also true with respect to the eye of a person in the upper band of the near-infrared spectrum. As shown therein, in the upper band of the near-infrared spectrum, reflectance is much lower than natural hair. Even if true human hair is used to be fitted in a toupee, due to the chemical processing used in making a toupee, the reflective characteristics are altered. Although the difference in reflectivity when comparing a true human hair wig to true natural human hair is much subtler, such reflectivity differences are still substantial and can be easily captured.

In addition, the reflectance of various artificial materials, such as those used in disguises and as generally defined below (heavy make-up, artificial face parts, add-on hair, etc.) typically have a reflectance that is significant beyond 1.4 microns. For example, as shown in FIG. 16, and previously described herein, the reflectance properties for cotton, wood, and polyamide do not drop significantly in reflectance after the 1.4 micron point.

In view of the above, it can be seen that there is a significant contrast in reflectance properties between natural human skin and other artificial materials. For example, there are significant differences between natural human hair and human skin in the upper band of the near-infrared spectrum and between eyes of a face and human skin in the lower band of the near-infrared spectrum. Such contrast in reflectivity characteristics in the near-infrared spectrum allow operation of face detection according to the present invention.

Yet further, as previously described herein, radiation in both the upper and lower near-infrared bands can transmit through the window glass of vehicles. Therefore, this is a definite advantage compared to both the visible and the thermal infrared spectrums. As such, the present invention which uses the upper band of the near-infrared spectrum can detect and isolate skin even behind glass.

The skin detector module 26 according to the present invention uses at least a portion of the lower and upper band of the near-infrared spectrum to isolate skin versus background in the scene being monitored as reflected generally in block 74 of the face detection method 52 of FIG. 5. As used herein, the portion of the upper band of the near-infrared spectrum used includes a portion in the range from 1.4 microns to at least about 1.7 microns. As previously indicated herein, at 2.8 microns thermal energy begins to appear. As used herein, the portion of the lower band of the near-infrared spectrum includes a portion in the range from at least about 0.9 to 1.4 microns.

One skilled in the art will recognize that slightly shorter or longer ranges can also yield acceptable detection results. For example, with respect to the ranges given above, a deviation from such wavelength values which may produce acceptable detection results is contemplated to fall within the specified ranges. For example, the lower band may extend to 0.6 microns and the upper band may extend to 2.4 microns.

Further, as used herein, background includes any materials other than natural skin and/or natural hair, such as those items or materials in a scene. For example, wigs, make-up materials, artificial nose pieces, etc., formed from one or more artificial materials or inanimate objects such as polymers, fibers, etc., are referred to herein as background materials. Further, background objects are also referred to herein as artificial materials, e.g., a car behind a person, clothing of a person, etc.

One preferred embodiment of the skin isolation process (block 74) of the face detection method 52 shown generally in FIG. 5 may be performed using the concepts described above. The pixel mapping for the fusion of the two near-infrared images (i.e., the upper band and lower band images) is preferably as descried above and is as follows:

$$P(i,j)\text{fused} = P(i,j)\text{lower} - f \cdot P(i,j)\text{upper}$$

where, $P(i,j)x$ is the pixel value at position $(i,j)$ in the respective image x and f is the weight factor used (previously listed as constant C). For example, through experimentation it may be determined that a near optimal value for $f=1.38$. The weighted subtraction operation as previously described above increases substantially the contrast between human skin and the background in the image data.

Following the weighted subtraction process, a thresholding operation is applied. Various thresholding techniques have been used as is readily known to those skilled in the art. Any suitable thresholding process that provides for acceptable segmentation of dark and light regions may be used according to the present invention. In general, such thresholding processes compare the data representative of the reflection to one or more thresholding values. Such values may be based on a variety of factors, such as the reflection characteristics of natural skin, of natural hair, background, etc. For example, a thresholding process described in the article entitled "A Threshold Selection Method from Gray-Level Histograms" by Otsu, *IEEE Transactions on Systems, Man And Cybernetics*, Vol. SMC-9, No. 1, January 1979, may be used according to the present invention. The thresholding process generally involves a non-parametric and unsupervised method of threshold selection. An optimal threshold is selected so as to maximize the separability of the resultant classes in gray levels. The algorithm utilizes only the zeroth-order and the first-order cumulative moments of the gray level histogram. The speed of the system, in part because of the thresholding process, can provide real time images to the user.

Figures 22A, 22B:
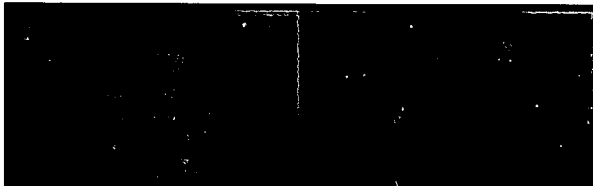
Figures 22C, 22D:

The skin isolation process is illustrated in the FIGS. 22a–22d. FIG. 22a illustrates a lower near-infrared band image wherein the skin has a high reflectivity and FIG. 22b illustrates an upper near-infrared band image wherein the skin has a relatively low reflectivity when compared to the high skin reflectivity in the upper lower band. The weighted subtraction image is shown in FIG. 22c and provides a sharper contrast between skin and background. Further, following application of a thresholding algorithm, the binary image of FIG. 22d is attained.

After the thresholded image is attained which is representative of a facial search area which can be searched for eyes of the person as further described below, further definition can be provided with respect to the binary image to reduce the search area. This can result in saved processing time later when other algorithms are applied to pixels in the facial search area.

For example, as shown in FIGS. 22e–22h and described with reference to FIG. 21, such further definition processing includes providing the image pixel data for skin isolated with respect to background, e.g., the binary image (block 80) as shown in FIG. 22d. Thereafter, opening and closing operations are performed on the image data to smooth the representation of the skin or outline thereof (block 82). In other words, the binary image undergoes a series of morphological operations.

Figures 22E, 22F:
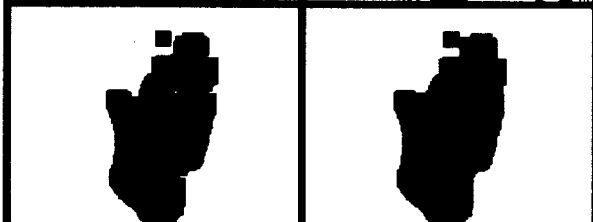

For example, the opening operation smoothes the contour of the skin region, breaks narrow isthmuses, and eliminates small islands and sharp peaks or capes. An open image is shown in FIG. 22e. The closing operation fuses narrow breaks and long, thin gulfs; eliminates small holes; and fills gaps on the contours. A closed image is shown in FIG. 22f. Such opening and closing techniques are known to one skilled in the art of image processing.

Figures 22G, 22H:

Further, the application of dilation and erosion algorithms may be used to result in the elimination of small image detail (block 84). Such techniques are also known by those skilled in the art. A dilated image is shown in FIG. 22g and an eroded image is shown in FIG. 22h.

Although several various image processing techniques have been described, there may be other techniques that can be used to further define the facial search area. This defined search area provides data for determining the extent of the detected face.

With the facial search area defined as described above through the isolation of skin in the scene, the eye location process 78 of the face detector method 52 may be applied to pixels that fall in the defined area. However, it should be recognized that the eye location process may be applied to a much larger area without ever having defined a facial search area to locate eyes of a person. However, preferably skin is isolated relative to background to provide a smaller region upon which to apply the eye location process 78.

The main objective of the face detection method 52, and particularly the eye locator process 78, is to determine the orientation and extent of the face 13 of a detected person. This objective is attained by finding the location of one or both eyes of the face, preferably in the defined facial search area, as shall be described with reference to illustrative embodiments shown and described with reference to FIGS. 23–28.

The face detection method 52 must accurately determine the location of at least one eye in order to provide information of some use to a face recognition system. A major strength of the present invention is the exploitation of the phenomenology exhibited by the skin, eyes, and hair in the near-infrared band of the EM spectrum which has been described previously above.

The face detection method 52, and particularly the eye locator process 78, generally uses a three-step approach to determine the location of one or both eyes as shown in FIG. 23. Upon receipt of image data for the defined facial search area (block 90), e.g., the high and low band near-infrared images as shown in FIGS. 22a and 22b, respectively, and the output image from the skin detector module as exemplified in FIG. 22h, an extract process 91 is performed. The extraction process 91 extracts regions in the upper and lower near-infrared images that are likely to be the eyebrows (see, for example, FIG. 26a) and eyes (see, for example, FIG. 26b). The extracted regions likely to be the eyebrow and eye features are then fused into a composite feature image (see, for example, FIG. 26c).

Thereafter, the composite feature image is searched based on model data representative of an eye region, e.g., standardized data generally representative of a plurality of persons facial characteristics (block 98), to located eye containing regions. The center of one or both eyes of the face are then estimated within the located eye containing regions (block 100).

One illustrative face detection method 52, and particularly eye locator process 78, is described in further detail. First, the eye locator process 78 includes extracting regions in the upper and lower near-infrared images that are likely to be the eyebrows (block 92) and likely to be eyes (block 94), respectively. This extraction is accomplished by capitalizing upon the unique reflectance characteristics of human hair and skin in the upper and lower near-infrared bands.

In the upper near-infrared band, eyebrow hair stands out comparatively to the extremely low reflectivity of human skin. The threshold values found to be suitable for the eyebrow extraction are as follows:

$$B(P_u(x, y)) = \begin{cases} 0.65 < P_u(x, y) < 80 \\ 255, 65 >= P_u(x, y) \text{ or } P_u(x, y) >= 80 \end{cases}$$

where B(•) is the eyebrow threshold function, and $P_u(x, y)$ is the pixel value of the upper near-infrared image at position (x, y).

In the lower near-infrared band, the eyes stand out comparatively to the extremely high reflectivity of human skin. The threshold values found to be most suitable for the eye extraction are as follows:

$$E(P_l(x, y)) = \begin{cases} 150, 30 < P_l(x, y) < 90 \\ 255, 30 >= P_l(x, y) \text{ or } P_l(x, y) >= 90 \end{cases}$$

where E(•) is the eye threshold function, and $P_l(x, y)$ is the pixel value of the lower near-infrared image at position (x, y).

FIG. 26a shows at least one eyebrow region 400 extracted with other regions that meet the threshold. Further, FIG. 26b shows at least one eye 402 extracted with other regions that satisfy the threshold.

The extracted eyebrow and eye feature images are then fused into a composite feature image (block 96). As shown in FIG. 26c, a tri-level image is presented wherein the black areas denote likely eyebrow regions, gray areas denote likely eye regions, and the white areas denote all the rest.

As can be seen therein, the actual eyebrow region 400 and eye region 402 are in close proximity to one another. This relationship can be used to apply a template process as described further below to search the composite image to locate eye containing regions based on model eye region data (block 98).

One illustrative embodiment of the searching method 98 shall be described with reference to FIG. 24. As shown in FIG. 24, the searching method 98 includes receiving image data representative of the composite image including the extracted regions (block 200). A template model representative of the position of eyes and eyebrows, e.g., a template normalized over a plurality of persons, is applied to the composite feature image including the extracted regions (block 202). For example, the template models the appearance of an eye region in the composite feature image, given the constraints of human anatomy. Thereafter, image data representative of any found or resultant eye containing regions is provided for further analysis (block 204).

In one illustrative searching method 98, a template process, e.g., a Hough transform, is used to find the eye containing regions of the composite feature image. For example, a generalized Hough transform template such as described in D. H. Ballard, "Generalizing the Hough Transform to Detect Arbitrary Shapes," *Pattern Recognition*, Vol. 13, No. 2, pp. 111–122 (1981) is modeled after the expected appearance of an eye region in the composite feature image. An exemplary template 408 is shown in FIG. 27. The template 408 includes a black region 410 (modeling the eyebrow) over a gray region 420 (modeling the eye). The template 408 is rotated and sized at each point of implementation to account for the rotation and variation of individual faces. The result of this transformation is the location of one or more eye containing regions.

For example, FIG. 26d is an exemplary representation of the result of applying the template 408. The result is a tri-level image. The background 430 shows as white, the skin region as gray 432, and within the skin region the area(s) that exhibited the strongest response to the eye template are shown as black (e.g., eye containing region 434). In other words, FIG. 26d shows the result of the Hough Transform superimposed on the defined skin image. As can be seen in FIG. 26d, the border 436 is representative of the defined search area that outlines the detected or isolated skin as previously described herein. The extent of the face is dependant on parameters and/or characteristics of such a border.

One illustrative embodiment of the eye center estimation process 100 of the eye locator method 78 is shown in FIGS. 28a–28c, and shall be described with reference to FIG. 25. The estimation process 100 receives the data representative of the eye containing regions (block 210), preferably, in association with the defined isolated skin region (see, for example, FIG. 26d). The process 100 determines what type(s) of eye containing region(s) have been located (block 212). After the type(s) of eye containing region(s) have been identified, then the approximate center of one or both eyes can be estimated (block 214).

For example, the center of the subject's eyes may be estimated through blob analysis. A blob referring to a group of connected pixels. Because of the variation in human faces, many different patterns of 'eye' blobs, which correspond to eye containing regions, can arise in the resulting Hough Transform image as shown in FIGS. 28a–28c. Specifically, for example:

Case 1 as shown in FIG. 28a: There is a single blob that spans the width of the face region. This blob is bisected in the middle and processed as two smaller blobs to determine the center of both eyes contained therein.

Case 2 as shown in FIG. 28b: There are two blobs that are roughly equal size and which are generally of a larger size than any other blobs. The centers of both eyes represented thereby can be determined.

Case 3 as shown in FIG. 28c: There is a single small blob set apart from and of a larger size than any other blobs. In this case, only a single eye center is determined.

Ultimately, the face detector locates the center of one or both of the eyes. For example, the center may be taken as the centroids of the selected blobs. However, as the blobs represent not only eyes, but also eyebrows, the center of the eyes will not be the centroid but will generally be found as a function of the centroid of such blobs, e.g., offset from the centroid by a particular distance.

Once the center of the eyes are located, then the orientation of the head can also be determined. For example, if the eyes fall within a certain region of the isolated skin, then it may be determined that the head is at a certain position, e.g., the subject may be looking down or up.

After the orientation and location of the head are known then it is possible to ascertain if a good image of the face can be extracted for recognition purposes. It is also a viable option to extrapolate where necessary to create a frontal image of the face from any given rotation, provided of course that at least half of the face is visible.

All patents and references cited herein are incorporated in their entirety as if each were incorporated separately. Although the invention has been described with particular reference to the preferred embodiments thereof, variations and modifications of the present invention can be made within a contemplated scope of the claims, as is readily known to one skilled in the art.

What is claimed is:

1. A method for use in detecting a face of a person, the method comprising:
    providing image data representative of reflected light of a scene in at least a first and second bandwidth within a reflected infrared radiation range;
    extracting regions of the scene in the image data representative of reflected light of the scene in the first bandwidth within the reflected infrared radiation range which correspond to one or both eyebrows of a person;
    extracting regions of the scene in the image data representative of reflected light of the scene in the second bandwidth within the reflected infrared radiation range which correspond to one or both eyes of the person;
    combining the extracted regions of the scene which correspond to one or both eyebrows of the person with the extracted regions of the scene that correspond to one or both eyes of the person resulting in a composite feature image; and
    searching the composite feature image based on model data representative of an eye region to detect one or both eyes of the person.

2. The method of claim 1, wherein providing image data representative of reflected light of a scene in at least a first and second bandwidth within a reflected infrared radiation range comprises:
    providing a first image output representative of reflected light of a scene in a first bandwidth within a reflected infrared radiation range, wherein regions of the scene in the first image output are extracted which correspond to one or both eyebrows of the person, and further wherein the regions that correspond to one or both eyebrows of the person have a comparatively higher reflectivity in the first bandwidth than the reflectivity of human skin; and
    providing a second image output representative of reflected light of a scene in a second bandwidth within a reflected infrared radiation range, wherein regions of the scene in the second image output are extracted which correspond to one or both eyes of the person, and further wherein the regions that correspond to one or both eyes of the person have a comparatively lower reflectivity in the second bandwidth than the reflectivity of human skin.

3. The method of claim 2, wherein a wavelength between the first and second bandwidths is about 1.4 microns.

4. The method of claim 3, wherein the second bandwidth is between at least about 0.9 microns and 1.4 microns and the first bandwidth is between 1.4 microns and at least about 1.7 microns.

5. The method of claim 2, wherein the method further comprises defining a facial search area by isolating skin of a person in the scene relative to background based on the first and second image output.

6. The method of claim 5, wherein a difference in reflectance for human skin in the first bandwidth relative to the second bandwidth is greater than a difference in reflectance for objects in the background other than human skin in the first bandwidth relative to the second bandwidth.

7. The method of claim 5, wherein defining the facial search area by isolating skin of the person in the scene comprises performing a weighted difference calculation of spectral power of the pixels of the first image output with spectral power of corresponding pixels of the second image output resulting in a weighted difference output for the pixels.

8. The method of claim 7, wherein defining the facial search area by isolating skin of the person in the scene further comprises comparing the weighted difference output for the pixels to one or more threshold values to differentiate pixels representative of skin from pixels representative of objects in the background other than human skin.

9. The method of claim 1, wherein the method further comprises defining a facial search area by isolating skin of a person in die scene relative to background.

10. The method of claim 9, wherein regions of the scene in the image data which correspond to one or both eyebrows of the person or which correspond to one or both eyes of the person are extracted from within the defined search area.

11. The method of claim 9, wherein the method further comprises detecting one of orientation or extent of the face of the person based on the detected one or both eyes of the person and the isolated skin of the person.

12. The method of claim 1, wherein the method further comprises detecting the orientation of the face of the person based at least on whether one or both eyes are detected.

13. The method of claim 1, wherein searching the composite feature image based on model data representative of an eye region to detect one or both eyes of the person comprises:
    searching the composite feature image based on model data representative of an eye region resulting in one or more eye containing regions; and
    estimating the center of one or both eyes within the one or more eye containing regions.

14. The method of claim 13, wherein searching the composite feature image based on model data representative of an eye region resulting in one or more eye containing regions comprises applying a template representative of a relationship between eyes and eyebrows of a plurality of persons to the composite feature image to locate the one or more eye containing regions.

15. The method of claim 13, wherein estimating the center of one or both eyes within the one or more eye containing regions comprises determining whether the one or more eye containing regions are a single blob that spans a major portion of the face of the person, two blobs of about equivalent size, or a single blob that is relatively smaller than the size of the single blob that spans a major portion of the face of the person but is larger than other eye containing regions located.

16. The method of claim 1, wherein the method further comprises monitoring luminance level in the scene and dynamically adjusting the luminance level in response thereto.

17. A system for use in detecting a face of a person, the system comprising:
    at least one imaging device operable to provide image data representative of reflected light of a scene in at least a first and second bandwidth within a reflected infrared radiation range; and
    processing apparatus operable to:

extract regions of the scene in the image data representative of reflected light of the scene in the first bandwidth within the reflected infrared radiation range which correspond to one or both eyebrows of a person;

extract regions of the scene in the image data representative of reflected light of the scene in the second bandwidth within the reflected infrared radiation range which correspond to one or both eyes of the person;

combine the extracted regions of the scene which correspond to one or both eyebrows of the person with the extracted regions of the scene that correspond to one or both eyes of the person resulting in a composite feature image; and search the composite feature image based on model data representative of an eye region to detect one or both eyes of the person.

18. The system of claim 17, wherein the at least one imaging device comprises:

a first imaging device sensitive to light of the first bandwidth within a reflected infrared radiation range to provide a first image output representative of the scene, wherein regions of the scene in the first image output are extracted which correspond to one or both eyebrows of the person, and further wherein the regions that correspond to one or both eyebrows of the person have a comparatively higher reflectivity in the first bandwidth than the reflectivity of human skin; and a second imaging device sensitive to light of the second bandwidth within the reflected infrared radiation range to provide a second image output representative of the scene, wherein regions of the scene in the second image output are extracted which correspond to one or both eyes of the person, and further wherein the regions that correspond to one or both eyes of the person have a comparatively lower reflectivity in the first bandwidth than the reflectivity of human skin.

19. The system of claim 18, wherein a wavelength between the first and second bandwidths is about 1.4 microns.

20. The system of claim 18, wherein the second bandwidth is between at least about 0.9 microns and 1.4 microns and the first bandwidth is between 1.4 microns and at least about 1.7 microns.

21. The system of claim 18, wherein the processing apparatus is further operable to define a facial search area by isolating skin of a person in the scene relative to background based on the first and second image output.

22. The system of claim 21, wherein a difference in reflectance for human skin in the first bandwidth relative to the second bandwidth is greater than a difference in reflectance for objects in the background other than human skin in the first bandwidth relative to the second bandwidth.

23. The system of claim 21, wherein the processing apparatus is further operable to perform a weighted difference calculation of spectral power of the pixels of the first image output with spectral power of corresponding pixels of the second image output resulting in a weighted difference output for the pixels.

24. The system of claim 23, wherein the processing apparatus is further operable to compare the weighted difference output for the pixels to one or more threshold values to differentiate pixels representative of skin from pixels representative of objects in the background other than human skin.

25. The system of claim 17, wherein the processing apparatus is further operable to define a facial search area by isolating skin of a person in the scene relative to background.

26. The system of claim 25, wherein regions of the scene in die image data which correspond to one or both eyebrows of the person or which correspond to one or both eyes of the person are extracted from within the defined facial search area.

27. The system of claim 25, wherein the processing apparatus is further operable to detect one of orientation or extent of the face of the person based on the detected one or both eyes of the person and the isolated skin of the person.

28. The system of claim 17, wherein the processing apparatus is further operable to detect the orientation of the face of the person based at least on whether one or both eyes are detected.

29. The system of claim 17, wherein the processing apparatus is further operable to:

search the composite feature image based on model data representative of an eye region resulting in one or more eye containing regions; and estimate the center of one or both eyes within the one or more eye containing regions.

30. The system of claim 29, wherein the processing apparatus is further operable to apply a template representative of a relationship between eyes and eyebrows of a plurality of persons to the composite feature image to locate the one or more eye containing regions.

31. The system of claim 29, wherein the processing apparatus is further operable to determine whether the one or more eye containing regions are a single blob that spans a major portion of the face of the person, two blobs of about equivalent size, or a single blob that is relatively smaller than the size of the single blob that spans a major portion of the face of the person but is larger than other eye containing regions located.

32. The system of claim 17, wherein the system further comprises a detection device operable to monitor luminance level in the scene and control means to dynamically adjust the luminance level provided by a light source in response thereto.

33. A method for use in detecting a face of a person, the method comprising:

providing a first image output representative of reflected light of a scene in a first bandwidth within a reflected infrared radiation range;

providing a second image output representative of reflected light of a scene in a second bandwidth within a reflected infrared radiation range;

defining at least a facial search area by isolating skin of a person in the scene relative to background based on the first and second image output, wherein a difference in reflectance for human skin in the first bandwidth relative to the second bandwidth is greater than a difference in reflectance for objects in the background other than human skin in the first bandwidth relative to the second bandwidth;

extracting regions in the defined facial search area which correspond to one or both eyebrows of the person, wherein the regions that correspond to one or both eyebrows of the person have a comparatively higher reflectivity in the first bandwidth than the reflectivity of human skin; and extracting regions in the defined facial search area which correspond to one or both eyes of the person, wherein the regions that correspond to one or both eyes of the person have a comparatively lower reflectivity in the second bandwidth than the reflectivity of human skin;

combining the extracted regions of the scene which correspond to one or both eyebrows of the person with the extracted regions of the scene that correspond to one or both eyes of the person resulting in a composite feature image;

searching the composite feature image based on model data representative of an eye region to locate one or more eye containing regions; and estimating the center of one or both eyes within the one or more eye containing regions.

34. The method of claim 33, wherein a wavelength between the first and second bandwidths is about 1.4 microns.

35. The method of claim 33, wherein the second bandwidth is between at least about 0.9 microns and 1.4 microns and the first bandwidth is between 1.4 microns and at least about 1.7 microns.

36. The method of claim 33, wherein defining the facial search area by isolating skin of the person in the scene comprises performing a weighted difference calculation of spectral power of the pixels of the first image output with spectral power of corresponding pixels of the second image output resulting in a weighted difference output for the pixels.

37. The method of claim 36, wherein defining the facial search area by isolating skin of the person in the scene further comprises comparing the weighted difference output for the pixels to one or more threshold values to differentiate pixels representative of skin from pixels representative of objects in the background other than human skin.

38. The method of claim 33, wherein the method further comprises detecting one of orientation or extent of the face of the person based on the detected one or both eyes of the person and the isolated skin of the person.

39. The method of claim 33, wherein the method further comprises detecting the orientation of the face of the person based at least on whether one or both eyes are detected.

40. The method of claim 33, wherein searching the composite feature image based on model data representative of an eye region resulting in one or more eye containing regions comprises applying a template representative of a relationship between eyes and eyebrows of a plurality of persons to the composite feature image to locate the one or more eye containing regions.

41. The method of claim 33, wherein estimating the center of one or both eyes within the one or more eye containing regions comprises determining whether the one or more eye containing regions are a single blob that spans a major portion of the face of the person, two blobs of about equivalent size, or a single blob that is relatively smaller than the size of the single blob that spans a major portion of the face of the person but is larger than other eye containing regions located.

42. The method of claim 33, wherein the method further comprises applying at least data representative of the estimated center of the one or both eyes to a face recognition system.

* * * * *